US012304599B2

(12) United States Patent
Nakagawa et al.

(10) Patent No.: US 12,304,599 B2
(45) Date of Patent: May 20, 2025

(54) SHIP MONITORING SYSTEM, SHIP MONITORING METHOD, AND INFORMATION PROCESSING DEVICE

(71) Applicant: Furuno Electric Co., Ltd., Nishinomiya (JP)

(72) Inventors: Kazuya Nakagawa, Amagasaki (JP); Yuichi Takebayashi, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 208 days.

(21) Appl. No.: 18/196,440

(22) Filed: May 12, 2023

(65) Prior Publication Data

US 2023/0278681 A1 Sep. 7, 2023

Related U.S. Application Data

(63) Continuation-in-part of application No. PCT/JP2021/037789, filed on Oct. 12, 2021.

(30) Foreign Application Priority Data

Nov. 12, 2020 (JP) .................. 2020-188726

(51) Int. Cl.
 *B63B 43/18* (2006.01)
 *G01S 13/937* (2020.01)
 *G08G 3/02* (2006.01)

(52) U.S. Cl.
 CPC ............ *B63B 43/18* (2013.01); *G01S 13/937* (2020.01); *G08G 3/02* (2013.01)

(58) Field of Classification Search
 CPC ......... B63B 43/18; G01S 13/937; G08G 3/02; G08G 3/00
 See application file for complete search history.

(56) References Cited

U.S. PATENT DOCUMENTS 5,515,287 A  5/1996 Hokoyama et al.
6,408,248 B1 *  6/2002 Yancey, Jr. ............. G08G 3/02
                                                    342/104

(Continued)

FOREIGN PATENT DOCUMENTS

JP  H07-129872 A  5/1995
JP  H07-246998 A  9/1995

(Continued)

OTHER PUBLICATIONS

18196440_2025-01-27_JP_2021146778_A_M.pdf, machine translation of JP-2021146778-A (Year: 2021).*
Extended European search report issued on Sep. 18, 2024, in corresponding European patent Application No. 21891570.0, 10 pages.
Ryohei Sawada et al., "Automatic ship collision avoidance using deep reinforcement learning with LSTM in continuous action spaces", Journal of Marine Science and Technology, 2021, vol. 26, pp. 509-524, total 16 pages, https://doi.org/10.1007/s00773-020-00755-0.

(Continued)

*Primary Examiner* — Timothy A Brainard
*Assistant Examiner* — Kenneth W Good
(74) *Attorney, Agent, or Firm* — XSENSUS LLP

(57) ABSTRACT

The present disclosure provides a ship monitoring system capable of visualizing a risk of a collision or an approach in a width direction perpendicular to a heading of another ship. The ship monitoring system includes a first data generator, a second data generator, and processing circuitry. The first data generator generates first ship data indicative of a position and a velocity of a first ship. The second data generator generates second ship data indicative of a position and a velocity of a second ship. The processing circuitry specifies a risk range where a risk value indicative of a risk of a collision between the first ship and the second ship is (Continued)

above a threshold among an estimated course of the second ship, based on a position of the first ship and a position of the second ship at each timing, that are estimated from the first ship data and the second ship data, when assuming that the first ship changes a course to an arbitrary direction and crosses the estimated course of the second ship. The processing circuitry further display a polygonal OZT (Obstacle Zone by Target) having vertexes at least comprised of a rear end and a front end of the risk range, and a representative point of the first ship located at a position corresponding to the rear end of the risk range.

18 Claims, 22 Drawing Sheets

(56) References Cited

U.S. PATENT DOCUMENTS

| | | | |
|---|---|---|---|
| 11,433,885 B1 * | 9/2022 | Beller | B60W 30/095 |
| 11,776,411 B2 * | 10/2023 | Hakoyama | B63B 43/18 |
| | | | 342/41 |
| 2020/0070818 A1 * | 3/2020 | Tominaga | B60W 10/20 |
| 2022/0135029 A1 * | 5/2022 | Poubel Orenstein | |
| | | | B60W 30/0953 |
| | | | 701/301 |

FOREIGN PATENT DOCUMENTS

| | | | |
|---|---|---|---|
| JP | 2000-128073 A | | 5/2000 |
| JP | 2016-049903 A | | 4/2016 |
| JP | 2021146778 A | * | 9/2021 |

OTHER PUBLICATIONS

International Search Report and Written Opinion mailed on Nov. 30, 2021, received for PCT Application PCT/JP2021/037789, filed on Oct. 12, 2021, 8 pages including English Translation.

Imazu et al., "Obstacle Zone by Target and its Expression", Japan Institute of Navigation, NII-Electronic Library Service, vol. 107, Sep. 2002, pp. 191-197 (7 pages including English Abstract).

* cited by examiner

CONVENTIONAL EXAMPLE

SHIP MONITORING SYSTEM, SHIP MONITORING METHOD, AND INFORMATION PROCESSING DEVICE

CROSS-REFERENCE TO RELATED APPLICATIONS

The application is a bypass continuation-in-part of PCT International Application No. PCT/JP2021/037789, filed Oct. 12, 2021, and which claims priority under 35 U.S.C. § 119 to Japanese Patent Application No. 2020-188726 which was filed on Nov. 12, 2020, the entire disclosure of which is hereby incorporated by reference.

TECHNICAL FIELD

The present disclosure relates to a ship monitoring system, a ship monitoring method, an information processing device, and a program.

BACKGROUND ART

Conventionally, various techniques for evaluating a risk of a collision between ships exist. For example, Nonpatent Document 1 discloses a technique for displaying an OZT (Obstacle Zone by Target). According to this technique, a circular OZT having a radius which is equal to a given safety separation distance is indicated on an estimated course of the other ship.

REFERENCE DOCUMENT(S) OF CONVENTIONAL ART

Patent Document

[Nonpatent Document 1] IMAZU, Hayama, FUKUTO, Junji, and NUMANO, Masayoshi, "Obstacle Zone by Targets and Its Display," The journal of Japan Institute of Navigation, 2002, Vol. 107, pp. 191-197

DESCRIPTION OF THE DISCLOSURE

Problem(s) to be Solved by the Disclosure

Meanwhile, according to the conventional technique for displaying the OZT, a plurality of circular OZTs are indicated on estimated courses of other ships so as to be continuously lined up. Since the OZTs have only a certain width in the width direction perpendicular to the estimated course, it is difficult for a user to grasp a risk of a collision or an approach in the width direction.

The present disclosure is made in view of the above-described problem, and a main purpose thereof is to provide a ship monitoring system, a ship monitoring method, an information processing device, and a program, which are capable of visualizing a risk of a collision or an approach in a width direction perpendicular to a heading of another ship.

SUMMARY OF THE DISCLOSURE

In order to solve the above-described problem, a ship monitoring system according to one aspect of the present disclosure includes a first data generator, a second data generator, a risk range specifier, and a display unit. The first data generator generates first ship data indicative of a position and a velocity of a first ship. The second data generator generates second ship data indicative of a position and a velocity of a second ship. The risk range specifier specifies a risk range where a risk value indicative of a risk of a collision between the first ship and the second ship is above a threshold among an estimated course of the second ship, based on a position of the first ship and a position of the second ship at each timing, that are estimated from the first ship data and the second ship data, when assuming that the first ship changes a course to an arbitrary direction and crosses the estimated course of the second ship. The display unit displays a polygonal OZT having vertexes at least comprised of a rear end and a front end of the risk range, and a representative point of the first ship located at a position corresponding to the rear end of the risk range.

Further, a ship monitoring method according to another aspect of the present disclosure includes generating, by a first data generator, first ship data indicative of a position and a velocity of a first ship, generating, by a second data generator, second ship data indicative of a position and a velocity of a second ship, specifying a risk range where a risk value indicative of a risk of a collision between the first ship and the second ship is above a threshold among an estimated course of the second ship, based on a position of the first ship and a position of the second ship at each timing, that are estimated from the first ship data and the second ship data, when assuming that the first ship changes a course to an arbitrary direction and crosses the estimated course of the second ship, and displaying, by a display unit, a polygonal OZT having vertexes at least comprised of a rear end and a front end of the risk range, and a representative point of the first ship located at a position corresponding to the rear end of the risk range.

Further, an information processing device according to another aspect of the present disclosure includes a risk range specifier and a display controller. The risk range specifier specifies a risk range where a risk value indicative of a risk of a collision between a first ship and a second ship is above a threshold among an estimated course of the second ship, based on a position of the first ship and a position of the second ship at each timing, that are estimated from first ship data indicative of a position and a velocity of the first ship and second ship data indicative of a position and a velocity of the second ship, when assuming that the first ship changes a course to an arbitrary direction and crosses the estimated course of the second ship. The display controller displays, on a display unit, a polygonal OZT having vertexes at least comprised of a rear end and a front end of the risk range, and a representative point of the first ship located at a position corresponding to the rear end of the risk range.

Further, a program according to another aspect of the present disclosure causes a computer to execute processing which includes specifying a risk range where a risk value indicative of a risk of a collision between a first ship and a second ship is above a threshold among an estimated course of the second ship, based on a position of the first ship and a position of the second ship at each timing, that are estimated from first ship data indicative of a position and a velocity of the first ship and second ship data indicative of a position and a velocity of the second ship, when assuming that the first ship changes a course to an arbitrary direction and crosses the estimated course of the second ship, and displaying, on a display unit, a polygonal OZT having vertexes at least comprised of a rear end and a front end of the risk range, and a representative point of the first ship located at a position corresponding to the rear end of the risk range.

Effect of the Disclosure

According to the present disclosure, it becomes possible to visualize the risk of a collision or an approach in the width direction perpendicular to the heading of another ship.

MODES FOR CARRYING OUT THE DISCLOSURE

Hereinafter, one embodiment of the present disclosure is described with reference to the drawings.

Figures 1, 2:
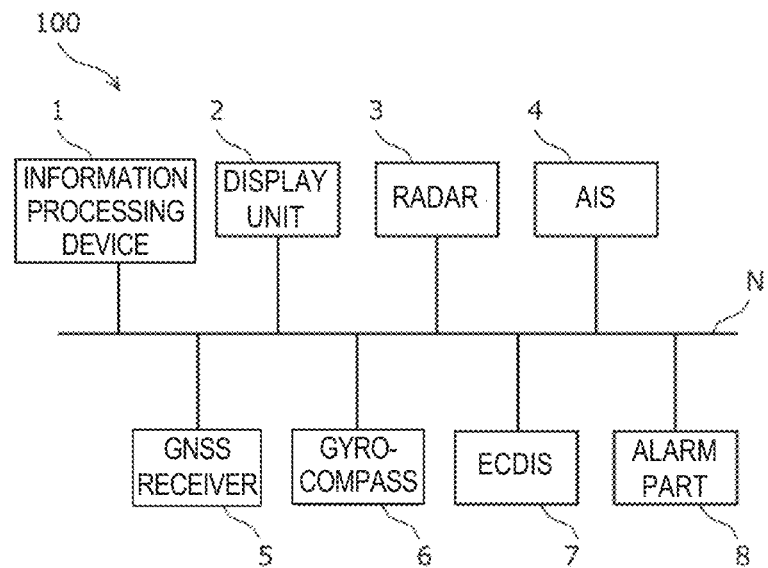
FIG. 1 is a view illustrating one example of a configuration of a ship monitoring system according to one embodiment.
FIG. 2 is a view illustrating one example of an other ships management database.

FIG. 1 is a block diagram illustrating one example of a configuration of a ship monitoring system 100 according to this embodiment. A ship monitoring method according to one embodiment may be realized by the ship monitoring system 100. The ship monitoring system 100 may be a system which is mounted on a ship and monitors ships which exist around the ship.

The ship on which the ship monitoring system 100 is mounted is one example of a first ship, and is referred to as "the ship" in the following description. Further, ship(s) which exists around the ship is one example of second ship(s), and is referred to as "another ship" or "other ships" in the following description.

Moreover, in the following description, a "velocity" is a vector quantity (so-called "ship velocity vector") indicative of a speed and a direction, and a "speed" is a scalar quantity.

The ship monitoring system 100 may include an information processing device 1, a display unit 2, a radar 3, an AIS 4, a GNSS receiver 5, a gyrocompass 6, an ECDIS 7, and an alarm part 8. These apparatuses may be connected to a network N (for example, LAN), so that mutual network communications are possible.

The information processing device 1 may be a computer including a CPU, a RAM, a ROM, a nonvolatile memory, and an input/output interface. The CPU of the information processing device 1 may perform information processing according to a program loaded to the RAM from the ROM or the nonvolatile memory.

The program may be supplied, for example, via an information storage medium, such as an optical disc or a memory card, or may be supplied, for example, via a communication network, such as the Internet or the LAN.

The display unit 2 may be a display device with a touch sensor, for example. The touch sensor may detect a position in a screen specified by a finger etc. Without being limited to the touch sensor, the specified position may be inputted by a trackball etc.

The radar 3 may transmit a radio wave around the ship, receive a reflection wave thereof, and generate echo data based on the reception signal. Further, the radar 3 may discriminate a target object from echo data, and generate Target Tracking data (TT data) indicative of a position and a velocity of the target object.

The AIS (Automatic Identification System) 4 may receive AIS data from other ship(s) or a land control which exists around the ship. Without being limited to the AIS, a VDES (VHF Data Exchange System) may also be used. The AIS data may include positions, velocities, etc. of other ships.

The GNSS receiver 5 may detect a position of the ship based on the radio wave received from a GNSS (Global Navigation Satellite System). The gyrocompass 6 may detect a heading of the ship. Without being limited to the gyrocompass, a GPS compass or a magnetic compass may also be used.

The ECDIS (Electronic Chart Display and Information System) 7 may acquire the position of the ship from the GNSS receiver 5, and display the position of the ship on an electronic nautical chart. Further, the ECDIS 7 may also display a schedule route of the ship on the electronic nautical chart. Without being limited to ECDIS, the GNSS plotter may also be used.

The alarm part 8 may issue an alarm, when there is a risk of a collision between the ship and another ship. For example, the alarm part 8 may give an alarm by indication, or may give an alarm by sound or light. The alarm by indication may be performed by the display unit 2. That is, the display unit 2 may also serve as the alarm part 8.

In this embodiment, the information processing device 1 may be an independent device. However, without being limited to this configuration, it may be integrally provided with another device, such as the ECDIS 7. That is, a functional part of the information processing device 1 may be realized by another device, such as the ECDIS 7.

Further, although the display unit 2 is also an independent device, without being limited to this configuration, a display unit of another device, such as the ECDIS 7, may be used as the display unit 2 which displays an image generated by the information processing device 1.

In this embodiment, a set of the GNSS receiver 5 and the ECDIS 7 is one example of a first data generator, which generates the-ship data indicative of the position and the velocity of the ship. In detail, the GNSS receiver 5 may detect the position of the ship, and the ECDIS 7 may detect the velocity of the ship based on a temporal change at the position of the ship.

Without being limited to this configuration, the velocity of the ship may be detected based on the heading of the ship detected by the gyrocompass 6, and a speed of the ship detected by a ship speed meter (not illustrated).

Further, the radar 3 or the AIS 4 is one example of a second data generator, which generates other-ships data indicative of positions and velocities of other ships. In detail, the TT data generated by the radar 3 may correspond to the other-ships data. Further, the AIS data generated by the AIS 4 may also correspond to the other-ships data.

FIG. 2 is a view illustrating one example of the other ships management database established in the memory of the information processing device 1. The other-ships data generated by the radar 3 or the AIS 4 may be registered to the other ships management database.

The other ships management database may include fields comprised of "other ships identifier," "position," "speed," and "bearing." Note that the positions and the bearings of other ships which are detected by the radar 3 may be converted into a coordinate system which is the same as the GNSS.

Figure 3:
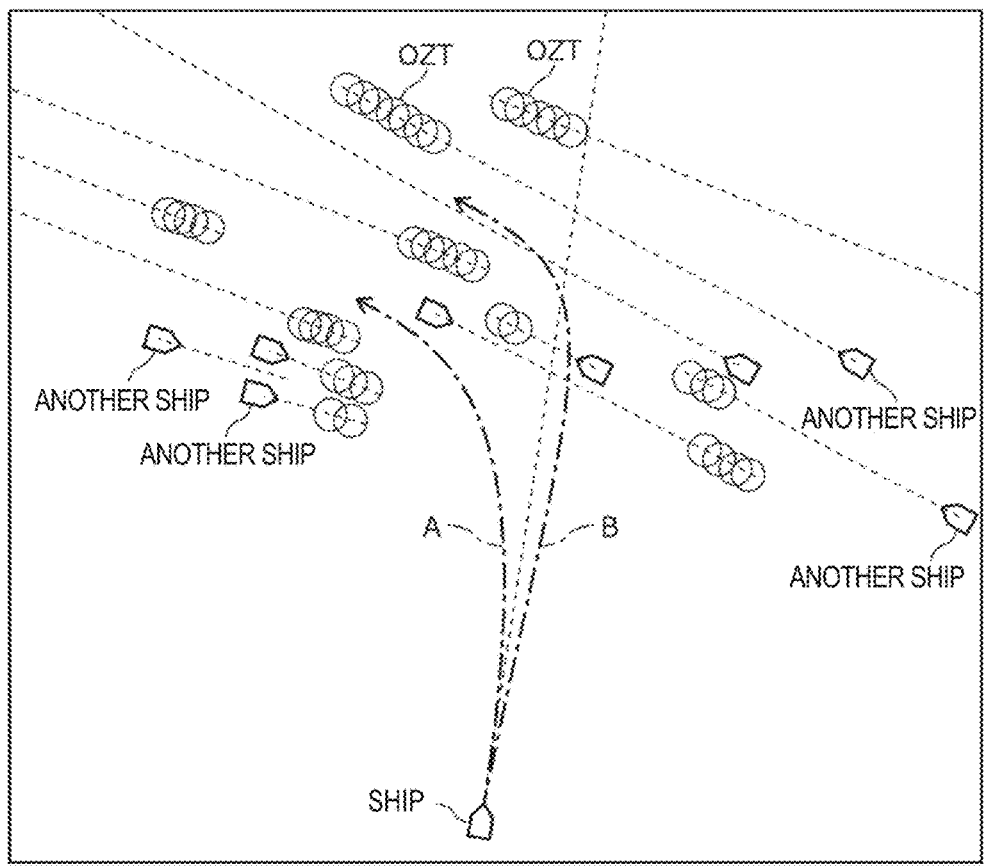
FIG. 3 is a view illustrating one example of indication of conventional OZTs.

FIG. 3 is a view illustrating one example of indication of conventional OZTs. The OZT (Obstacle Zone by Target) may be a zone where cruising of the ship may be blocked by another ship, which is displayed on an estimated course of another ship.

According to the conventional technique for displaying OZTs, since a plurality of circular OZTs are displayed so as to be continuously lined up in a range where a risk of a collision is high among the estimated course of another ship, it is easy for the user to grasp the risk of a collision or an approach on the course (heading). However, since the width of the OZTs is constant in the width direction perpendicular to the heading, it is difficult for the user to grasp the risk of a collision or an approach in the width direction.

The example of FIG. 3 illustrates a situation where the ship joins an ocean space where a large number of other ships are cruising. According to this situation, when the ship takes a route A, it seems that there is sufficient space, but actually, the ship operator will feel tension because other ships are approaching from both the left and right. On the other hand, when the ship takes a route B, it appears that there is not sufficient space since symbols of other ships exist on the way, but actually, the ship operator feels less tension than on the route A because a less number of other ships approach.

Therefore, in this embodiment, as will be described below, the risk of a collision or an approach in the width direction perpendicular to the heading of another ship may be visualized by displaying a polygonal OZT in consideration of a spatial relationship between the ship and another ship upon the approach.

Figure 4:
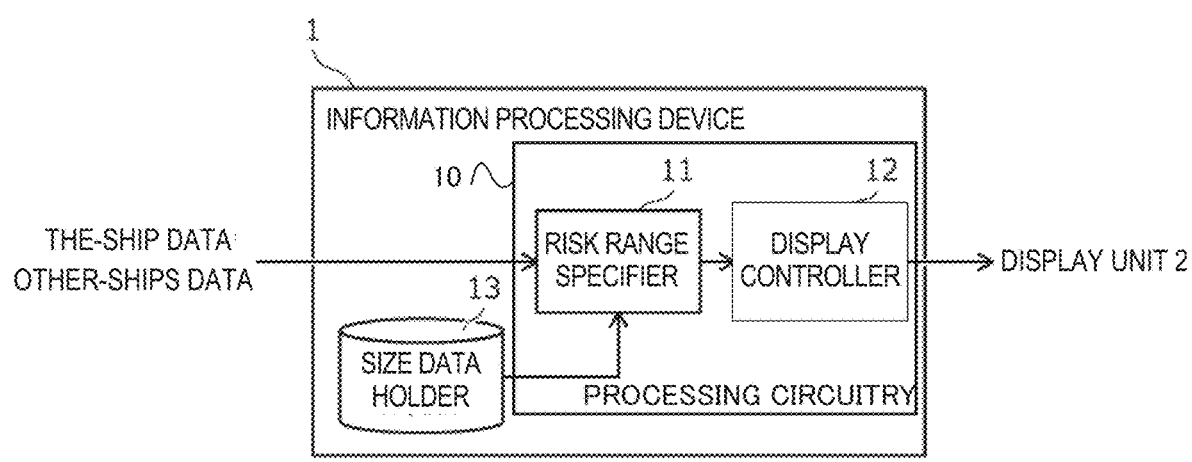
FIG. 4 is a view illustrating one example of a configuration of an information processing device according to one embodiment.

FIG. 4 is a view illustrating one example of a configuration of the information processing device 1 according to this embodiment, which realizes a ship monitoring method according to one embodiment. The information processing device 1 may include processing circuitry 10, and a size data holder 13. The processing circuitry 10 may include a risk range specifier 11, and a display controller 12.

The risk range specifier 11 and the display controller 12 may be realized by the CPU of the information processing device 1 performing information processing according to the program. The size data holder 13 may be established in the memory of the information processing device 1.

Figure 8A:
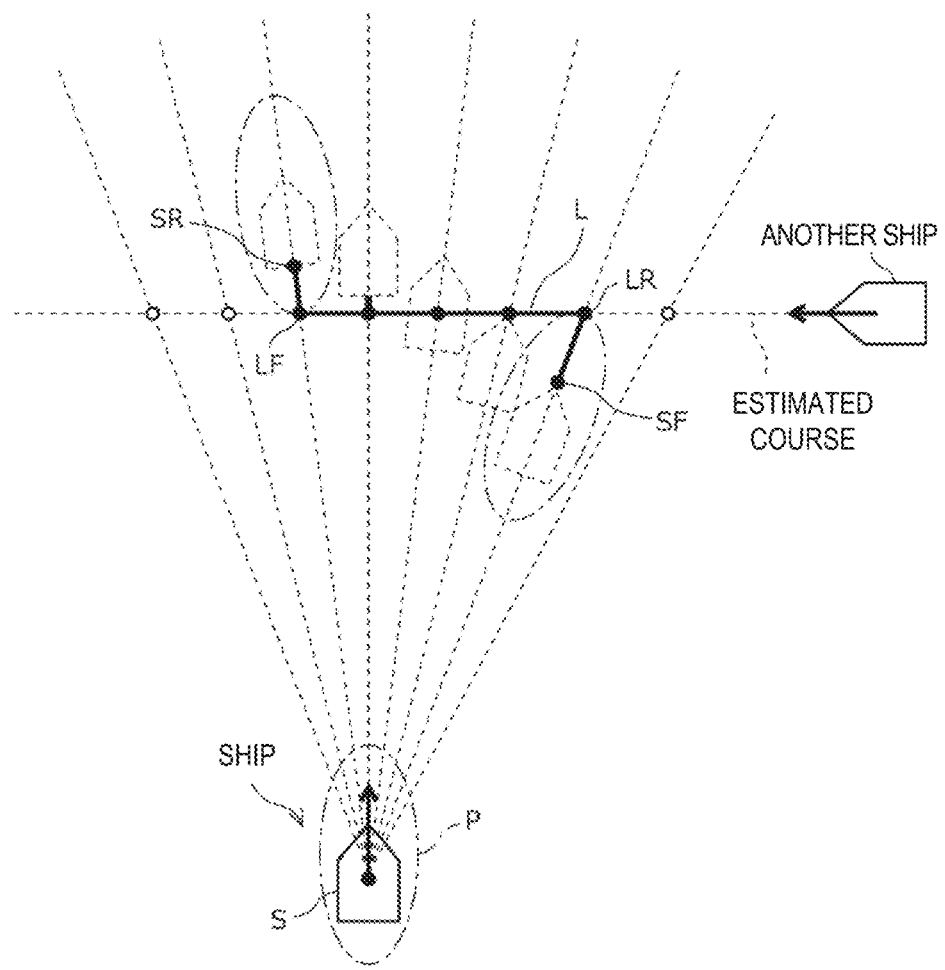
FIG. 8A is a view illustrating one example of a calculation of an OZT.

The risk range specifier 11 may specify a risk range L where a risk value of a collision between the ship and another ship is above a threshold among the estimated course of another ship, based on the position of the ship and a position of another ship at each timing, which are estimated from the-ship data and other-ships data, when the ship is assumed to change a course to an arbitrary direction and cross the estimated course of another ship (see FIG. 8A).

Figure 8B:
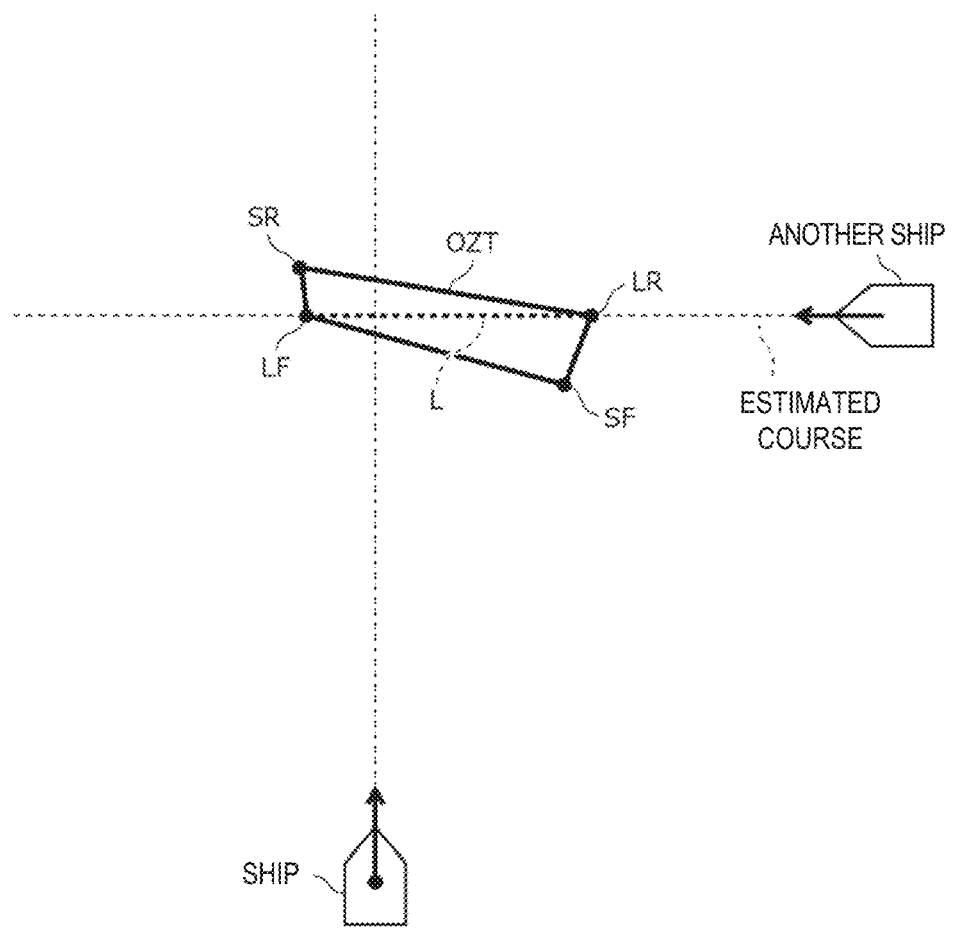
FIG. 8B is a view illustrating one example of indication of an OZT.

The display controller 12 may display, on the display unit 2, a quadrangular OZT having vertexes comprised of a rear end LR and a front end LF of the risk range L specified by the risk range specifier 11, a representative point SF of the ship which is located at a position corresponding to the rear end LR, and a representative point SR of the ship which is located at a position corresponding to the front end LF (see FIG. 8B).

Figure 5:
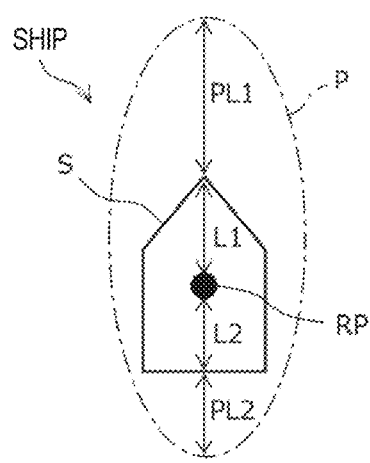
FIG. 5 is a view illustrating size data.
Figure 6:
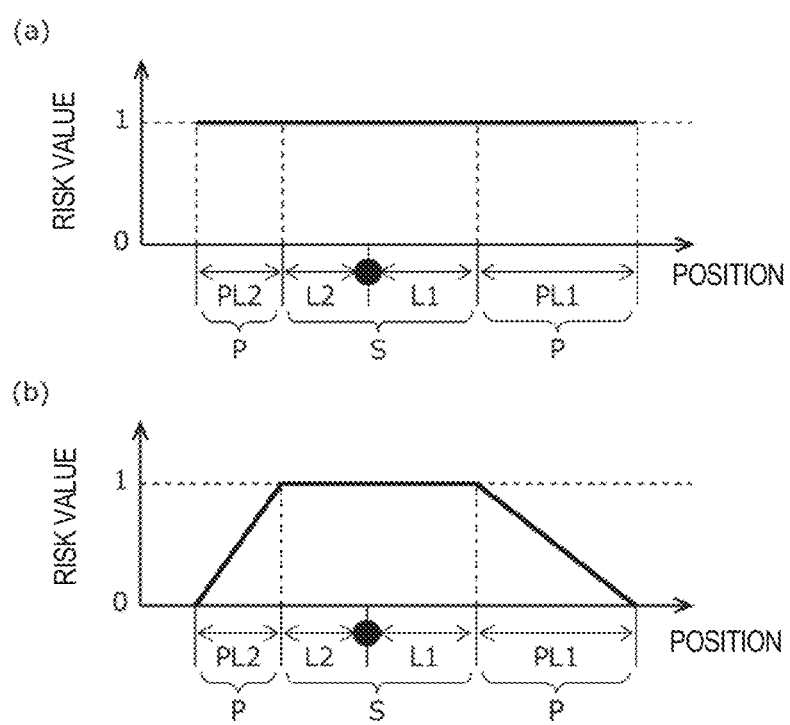
FIGS. 6(a) and 6(b) are views illustrating the size data.

FIG. 5 and FIGS. 6(*a*) and 6(*b*) are views illustrating size data of the ship held by the size data holder 13. The size data may include lengths L1 and L2 of a ship area S which is occupied by the ship, and lengths PL1 and PL2 of a watch area P which is set around the ship.

The ship area S which is occupied by the ship may be an area indicative of the physical size of the ship. In this embodiment, the ship area S of the ship may be indicated by line segments from a front end to a rear end of the ship. The length L1 may be a length from a reference position RP of the ship to the front end of the ship, and the length L2 may be a length from the reference position RP of the ship to the rear end of the ship. The reference position RP of the ship may correspond to antenna position(s) of the GNSS receiver 5 (see FIG. 1).

It may be considered that a collision occurs when another ship exists in the ship area S of the ship. As illustrated in FIGS. 6(*a*) and 6(*b*), the risk value may be set to 1 which is the maximum within the ship area S of the ship.

The watch area P set around the ship may be set in front of and behind the ship. In this embodiment, the watch area P of the ship may be indicated by a line segment extending forward from the front end of the ship, and a line segment extending rearward from the rear end of the ship. The length PL1 may be a length from the front end of the ship to the front end of the watch area P, and the length PL2 may be a length from the rear end of the ship to the rear end of the watch area P.

Note that the watch area P may not need to be set behind the ship. That is, the length PL2 may be 0. Further, the watch area P may not need to be set in front of the ship. That is, the length PL1 may be 0.

The watch area P may be set according to an area where a physical contact with another ship does not occur, but the ship operator feels mentally undesirable if another ship enters. A personal space where a person feels uncomfortable when another person approaches can be taken as an example of the watch area P.

In this embodiment, as illustrated in FIG. 6(a), the risk value may be set to 1 which is the maximum also within the watch area P, similarly to the ship area S. Without being limited to this configuration, as illustrated in FIG. 6(b), the watch area P may be set so that the risk value becomes smaller gradually as separating from the ship.

Note that, although in this embodiment the ship area S and the watch area P of the ship are indicated by the line segments in the front-and-rear direction, without being limited to this configuration, while adding the length in the width direction, the ship area S and the watch area P of the ship may be indicated by a rectangular area, or may be indicated by a line segment crossing type in which a line segment in the front-and-rear direction and a line segment in the width direction cross, or may be indicated by a bumper type, such as an ellipse, oval, or egg shape.

Also for another ship, similarly to for the ship, a ship area which is occupied by another ship, and a watch area set around another ship may be set. For example, the length of another ship in the front-and-rear direction may use a length of a ship included in the AIS data, or may use a given length according to a ship type included in the AIS data. Without being limited to this configuration, the length of another ship in the front-and-rear direction may be estimated, for example, based on the echo data of the radar 3. A reference position of another ship may be a given position, such as the center of the ship area of another ship.

Figure 7:
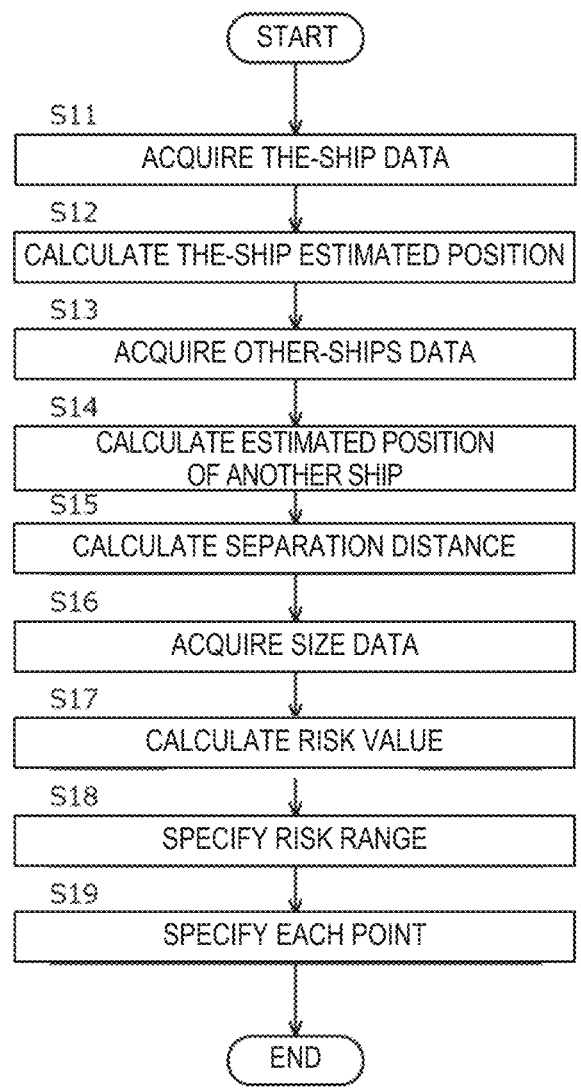
FIG. 7 is a view illustrating one example of a procedure of processing performed by a risk range specifier.

FIG. 7 is a view illustrating one example of a procedure of concrete processing which is performed by the risk range specifier 11. The information processing device 1 may function as the risk range specifier 11 by performing processing illustrated in this drawing according to the program. FIGS. 8A and 8B are views illustrating one example of a calculation and indication of an OZT.

First, the risk range specifier 11 may acquire the-ship data (S11), and calculate an estimated position of the ship at each timing based on the acquired the-ship data (S12).

In detail, the calculation of the estimated position of the ship may be performed under an assumption that the ship changes a course at the current position and cruises in an arbitrary direction, while maintaining the speed. That is, it may be assumed that, while a magnitude of the ship velocity vector of the ship is constant, a direction of the ship velocity vector of the ship is changed to the arbitrary direction at a reference timing, and after that, the ship continues cruising in the fixed direction from the position of the ship (the ship position) at the reference timing. Therefore, the estimated position of the ship at each timing may exist on a concentric circle centering on the ship position at the reference timing. A radius of each circle may be expressed by a product of a lapsed time from the reference timing and the magnitude of the ship velocity vector of the ship.

The estimated positions of the ship at respective timings may be indicated by a plurality of discrete concentric circles which are calculated respectively for a plurality of discrete timings. Without being limited to this configuration, the estimated position of the ship at each timing may be expressed by a formula of a circle including the lapsed time from the reference timing (described later in detail).

Note that, although in this embodiment the estimated position of the ship is calculated under the assumption that the speed of the ship is constant, without being limited to this configuration, the speed of the ship may be treated as a variable which changes with time. That is, as long as the estimated position of the ship according to the lapsed time from the reference timing can be obtained, the speed of the ship may not be constant. For example, the speed of the ship may increase or decrease gradually with progress of time.

Next, the risk range specifier 11 may acquire other-ships data (S13), and calculate the estimated position of another ship at each timing based on the acquired other-ships data (S14).

In detail, the calculation of the estimated position of another ship may be performed under the assumption that another ship cruises from the current position while maintaining the velocity. That is, it may be assumed that the magnitude and the direction of another ship velocity vector are constant, and another ship continues cruising from the position of another ship at the reference timing. Therefore, the estimated position of another ship at each timing may exist on a straight line which is an extension of the another ship velocity vector passing through the position of another ship at the reference timing.

The estimated positions of another ship at respective timings may be indicated by a plurality of discrete points which are respectively calculated for a plurality of discrete timings and are lined up on a straight line. Without being limited to this configuration, the estimated position of another ship at each timing may be expressed by a linear function passing through the position of another ship at the reference timing (described later in detail).

Note that, although in this embodiment the estimated position of another ship is calculated under the assumption that the velocity of another ship is constant, without being limited to this configuration, at least one of the speed and the direction of another ship may be treated as a variable which changes with time. That is, the velocity of another ship may not be constant, as long as the estimated position of another ship according to the lapsed time from the reference timing can be obtained. For example, the speed of another ship may increase or decrease gradually with progress of time. Further, another ship may change the course to a given direction, or may turn at a given ROT (Rate of Turn).

Next, the risk range specifier 11 may calculate a separation distance between the estimated position of the ship and the estimated position of another ship at each timing (S15). The separation distance may be expressed by a distance between the point indicating the estimated position of the ship and the point indicating the estimated position of another ship.

Since the estimated position of the ship at a certain timing is indicated by a circle as described above, the risk range specifier 11 may select a position nearest to the estimated position of another ship at a certain timing from the circle indicative of the estimated positions of the ship at the same timing, and calculate the separation distance.

Next, the risk range specifier 11 may acquire the size data from the size data holder 13 (S16), and calculate a risk value indicative of the risk of a collision between the ship and another ship, based on the separation distance and the size data (S17).

In the example of FIG. 8A, the risk range specifier 11 may set the ship area S and the watch area P of the ship by using the size data of the ship (see FIG. 5 and FIGS. 6(a) and 6(b)), and determine whether the point indicating the estimated position of another ship is included in the ship area S or the watch area P of the ship.

For example, when the estimated position of the ship is in front of the estimated course of another ship, and the separation distance is less than the distance L1 from the reference position RP of the ship to the front end of the ship area S, it may be determined that the estimated position of another ship is included in the ship area S of the ship.

Further, when the separation distance is more than the distance L1 and is less than a distance L1+PL1 from the reference position RP of the ship to the front end of the watch area P, it may be determined that the estimated position of another ship is included in the watch area P of the ship.

On the other hand, when the estimated position of the ship is behind (deeper than) the estimated course of another ship, and the separation distance is less than the distance L2 from the reference position RP of the ship to the rear end of the ship area S, it may be determined that the estimated position of another ship is included in the ship area S of the ship. Further, when the separation distance is more than the distance L2 and is less than a distance L2+PL2 from the reference position RP of the ship to the rear end of the watch area P, it may be determined that the estimated position of another ship is included in the watch area P of the ship.

It can be distinguished by the sign (positive/negative) of the separation distance whether the estimated position of the ship is in front of or behind the estimated course of another ship.

Figure 10:
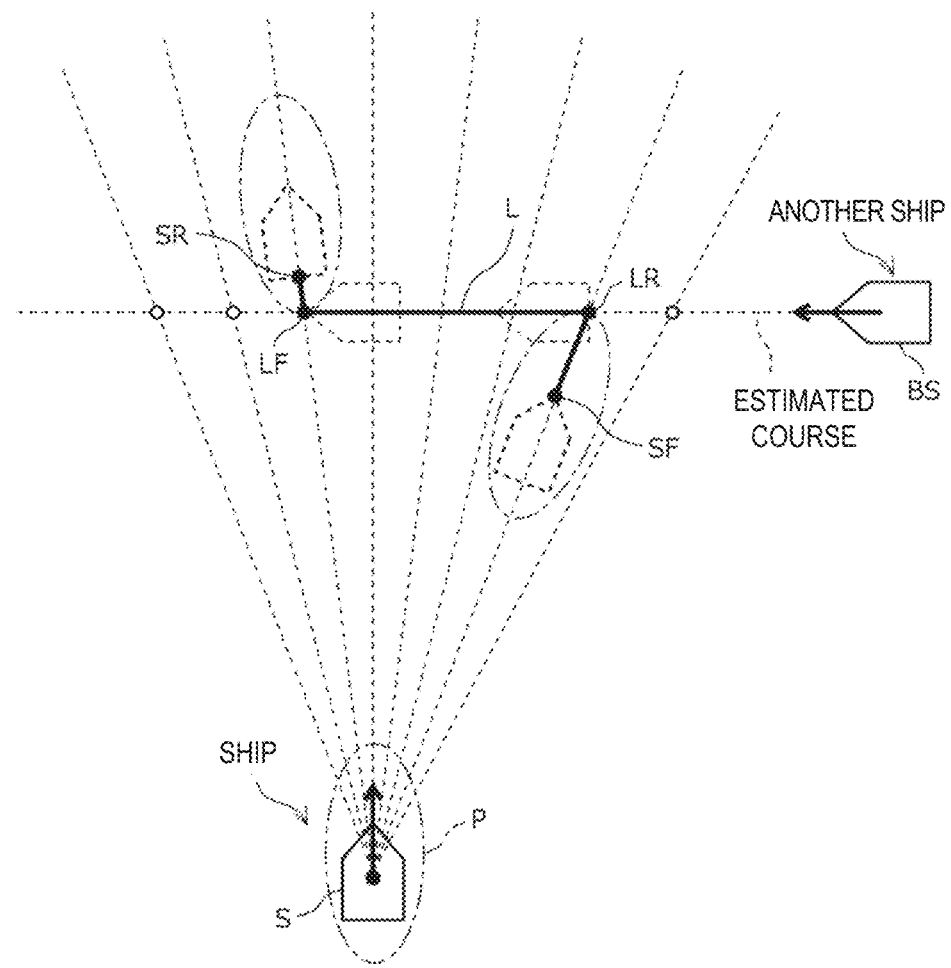
FIG. 10 is a view illustrating one example of a calculation of an OZT.
Figure 11:
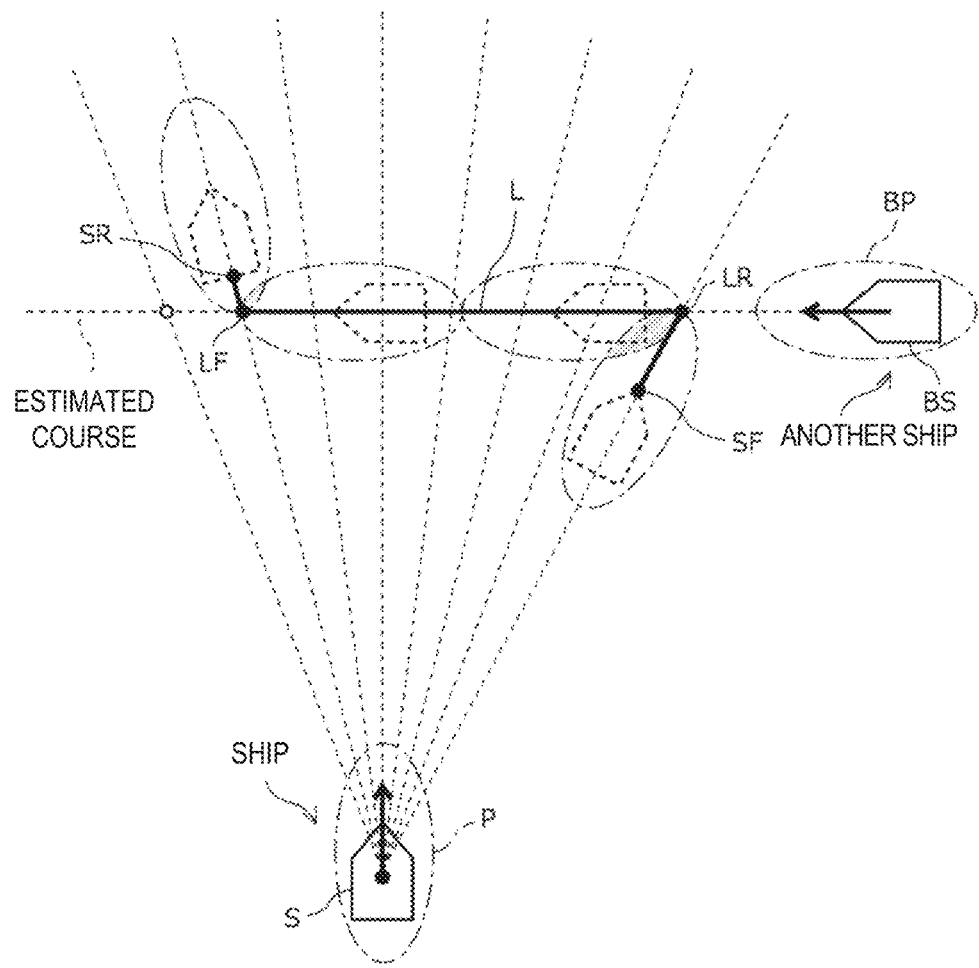
FIG. 11 is a view illustrating one example of a calculation of an OZT.

In this embodiment, the separation distance between the point indicating the estimated position of the ship and the point indicating the estimated position of another ship may be obtained. However, as illustrated in FIGS. 10 and 11, when setting a ship area BS or a watch area BP of another ship, a separation distance between the point indicating the estimated position of the ship, and a front end or a rear end of the ship area BS or the watch area BP of another ship may be obtained.

The risk range specifier 11 may set the risk value to 1 which is the maximum, when the point indicating the estimated position of another ship is included in the ship area S or the watch area P of the ship, and set the risk value to 0 which is the minimum, when the point is not included (see FIG. 6(a)). The threshold may be defined within a range from 0 to 1, and when the point indicating the estimated position of another ship is included in the ship area S or the watch area P of the ship, the risk value may become above the threshold.

Without being limited to this configuration, the watch area P may be set so that the risk value becomes smaller gradually as separating from the ship (see FIG. 6(b)), and in this case, when the point indicating the estimated position of another ship is included in the watch area P of the ship, and it approaches the ship area S of the ship to some extent, the risk value may become above the threshold.

Note that the calculation by the risk range specifier 11 may be performed as follows. Here, one example of calculating a position at which the front end of the ship area of the ship contacts the rear end of the ship area of another ship is described.

Figure 9:
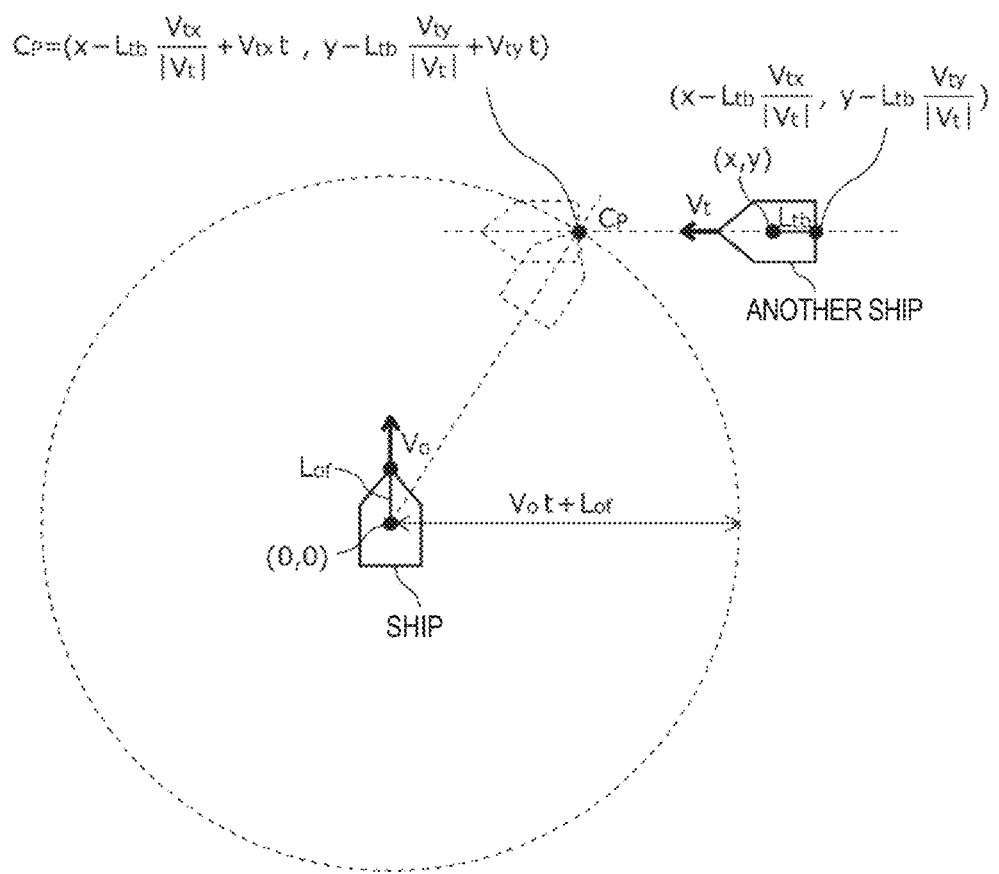
FIG. 9 is a view illustrating one example of a calculation of an OZT.

As illustrated in FIG. 9, an initial position of the ship at t=0 (that is, the current position of the ship) may be defined as the origin (0, 0) of the xy plane. Further, the velocity vector of the ship may be defined as $V_o$. Further, a length from the reference position of the ship to the front end may be defined as $L_{of}$ (corresponding to L1 in FIG. 5). When it is assumed that the ship is instantaneously changeable at the current position of its course to any of all directions (360°), and the ship cruises at a constant ship speed, the position of the front end of the ship area of the ship after a lapse of a time t can be expressed by a circumference of a radius $V_o t + L_{of}$ centering on the origin (0, 0).

Meanwhile, the initial position of another ship at t=0 (that is, the current position of another ship) may be defined as (x, y) in the xy plane. Further, the velocity vector of the ship may be defined as $V_t$. Further, a length from the reference position to the rear end of another ship may be defined as $L_{tb}$. When it is assumed that another ship cruises while maintaining both its course and ship speed from the current position, a position CP of the rear end of the ship area of another ship after a lapse of the time t can be expressed by Formula 1 below. Here, $V_{tx}$ is x-component of $V_t$ and $V_{ty}$ is y-component of $V_t$.

$$C_P = \left( x - L_{tb} \frac{V_{tx}}{|V_t|} + V_{tx} t, \; y - L_{tb} \frac{V_{ty}}{|V_t|} + V_{ty} t \right)$$

Here, since the case where the front end of the ship area of the ship contacts the rear end of the ship area of another ship is a case where the position CP of the rear end of the ship area of another ship is located on the circumference of the radius $V_o t + L_{of}$ indicative of the position of the front end of the ship area of the ship, Formula 2 below can be established.

$$V_o t + L_{of} = \sqrt{\left( x - L_{tb} \frac{V_{tx}}{|V_t|} + V_{tx} t \right)^2 + \left( y - L_{tb} \frac{V_{ty}}{|V_t|} + V_{ty} t \right)^2}$$

By solving Formula 2, the time t at which the front end of the ship area of the ship contacts the rear end of the ship area of another ship can be calculated. Further, by substituting the calculated time t for Formula 1 above, the position at which the front end of the ship area of the ship contacts the rear end of the ship area of another ship can be calculated.

Here, the position at which the front end of the ship area of the ship contacts the rear end of the ship area of another ship may be calculated. However, the position can be calculated similarly in other cases, such as when the front end of the watch area P of the ship contacts the rear end of the ship area BS of another ship as illustrated in FIG. 10, and when the front end of the watch area P of the ship contacts the rear end of the watch area BP of another ship as illustrated in FIG. 11.

Returning to the description of FIG. 7, the risk range specifier 11 may specify the risk range L where the risk value calculated at S17 described above becomes above the threshold (S18), and specify the rear end LR and the front end LF of the risk range L, the representative point SF of the ship which is located at the position corresponding to the rear end LR, and the representative point SR of the ship which is located at the position corresponding to the front end LF (S19). The front-and-rear direction of the risk range L corresponds to the front-and-rear direction of another ship.

As described above, in this embodiment, since the risk value becomes above the threshold when the point indicating the estimated position of another ship is included in the ship area S or the watch area P of the ship, the rear end LR of the risk range L may become the position at which the front end of the watch area P of the ship contacts the point indicating the position of another ship, as illustrated in FIG. 8A. Further, the front end LF of the risk range L may become the position at which the rear end of the watch area P of the ship contacts the point indicating the position of another ship.

Further, the representative point SF of the ship which is located at the position corresponding to the rear end LR of the risk range L may be the front end of the ship area S of the ship. In detail, the position of the ship corresponding to the rear end LR of the risk range L may be the position of the ship when the front end of the watch area P of the ship is located at the rear end LR of the risk range L. Without being limited to the front end of the ship area S of the ship, the representative point SF of the ship may be the reference position RP (see FIG. 5), the rear end of the ship area S of the ship, or the rear end of the watch area P of the ship.

Further, the representative point SR of the ship which is located at the position corresponding to the front end LF of the risk range L may be the rear end of the ship area S of the ship. In detail, the position of the ship corresponding to the front end LF of the risk range L may be the position of the ship when the rear end of the watch area P of the ship is located at the front end LF of the risk range L. Without being limited to the rear end of the ship area S of the ship, the representative point SR of the ship may be the reference position RP (see FIG. 5), the front end of the ship area S of the ship, or the front end of the watch area P of the ship.

The risk range specifier 11 may output to the display controller 12 the positions of the rear end LR and the front end LF of the risk range L, the representative point SF of the ship which is located at the position corresponding to the rear end LR, and the representative point SR of the ship which is located at the position corresponding to the front end LF, as the vertexes of the OZT, and then end this processing. Note that, if a plurality of other ships exist, the processings of S13-S19 may be performed for each of the plurality of other ships.

In the example of FIG. 8B, the display controller 12 may display, on a screen of the display unit 2, a quadrangular OZT having vertexes comprised of the rear end LR and the front end LF of the risk range L specified by the risk range specifier 11, the representative point SF of the ship which is located at the position corresponding to the rear end LR, and the representative point SR of the ship which is located at the position corresponding to the front end LF. Note that the corners of the OZT may be rounded.

Therefore, the OZT may become a shape which does not have a constant width, but each of the front part and the rear part of the risk range L may project toward the ship.

In detail, by making the representative point SF of the ship which is located at the position corresponding to the rear end LR of the risk range L as the vertex of the OZT, the OZT may project toward the estimated position of the ship at the rear part of the risk range L. On the other hand, by making the representative point SR of the ship which is located at the position corresponding to the front end LF of the risk range L as the vertex of the OZT, the OZT may project toward the estimated position of the ship at the front part of the risk range L.

By displaying the OZT with such a shape, it becomes possible to visualize the risk of a collision or an approach in the width direction perpendicular to the heading of another ship.

Without being limited to the above-described example, the risk range specifier 11 may determine whether the ship area S or the watch range P of the ship overlaps with the ship area BS of another ship, as illustrated in FIG. 10. In this example, the rear end LR of the risk range L may become the position at which the front end of the watch area P of the ship contacts the rear end of the ship area BS of another ship. The front end LF of the risk range L may become the position at which the rear end of the watch area P of the ship contacts the front end of the ship area BS of another ship.

Further, as illustrated in FIG. 11, the risk range specifier 11 may determine whether the ship area S or the watch range P of the ship overlaps with the ship area BS or the watch range BP of another ship. In this example, the rear end LR of the risk range L may become the position at which the front end of the watch area P of the ship contacts the rear end of the watch area BP of another ship. The front end LF of the risk range L may become the position at which the rear end of the watch area P of the ship contacts the front end of the watch area BP of another ship.

Further, without setting the watch area P of the ship, the risk range specifier 11 may determine whether the ship area S of the ship overlaps with the point indicating the position of another ship, the ship area BS, or the watch range BP. Moreover, without setting the ship area S and the watch area P of the ship, the risk range specifier 11 may determine whether the point indicating the position of the ship overlaps with the point indicating the position of another ship, the ship area BS, or the watch range BP.

Figure 12:
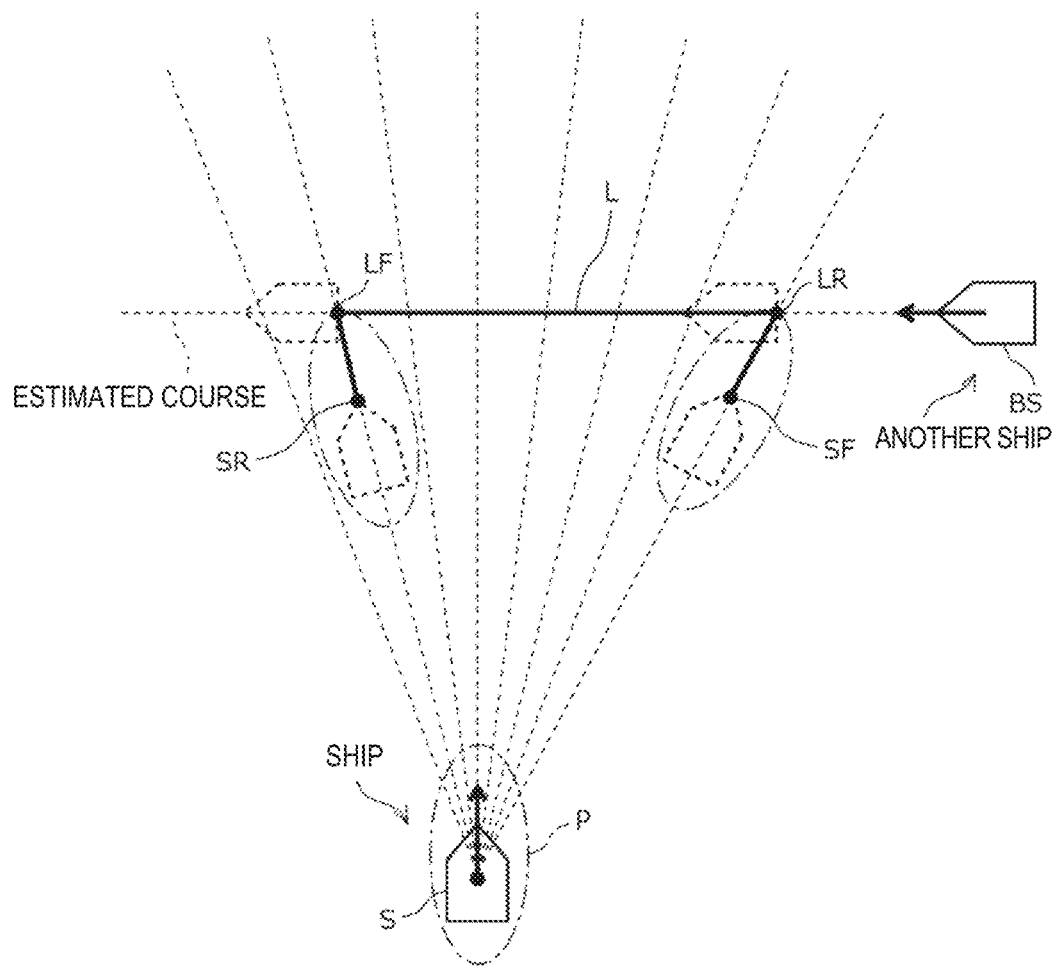
FIG. 12 is a view illustrating one example of a calculation of an OZT.

Note that, without being limited to the above-described example, the meeting relationship between the ship and another ship may become such that the front end of the watch area P of the ship contacts the rear end of the ship area BS (or the watch area BP) of another ship, both at the front end LF and the rear end LR of the risk range L, for example, as illustrated in FIG. 12. In this case, the representative point SR of the ship which is located at the position corresponding to the front end LF of the risk range L may be the front end of the ship area S of the ship, the reference position, the rear end of the ship area S of the ship, or the rear end of the watch area P of the ship.

Figure 13:
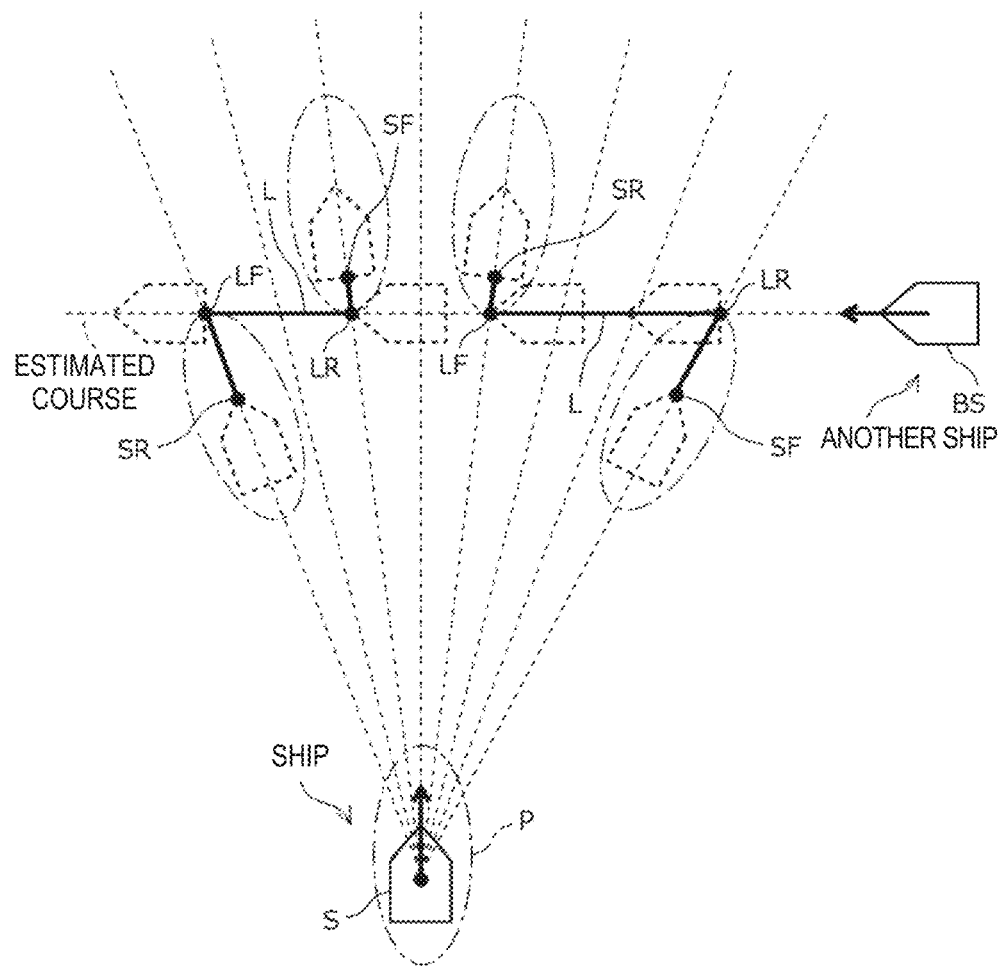
FIG. 13 is a view illustrating one example of a calculation of an OZT.

Further, as illustrated in FIG. 13, when two risk ranges L occur, in one of the risk ranges L distant from another ship, the rear end LR of the risk range L may become the position at which the rear end of the watch area P of the ship contacts the front end of the ship area BS (or the watch area BP) of another ship, and the front end LF of the risk range L may become the position at which the front end of the watch area P of the ship contacts the rear end of the ship area BS (or the watch area BP) of another ship.

In this case, the representative point SF of the ship which is located at the position corresponding to the rear end LR of the risk range L may be the rear end of the ship area S of the ship, the reference position, the front end of the ship area S of the ship, or the front end of the watch area P of the ship. Further, the representative point SR of the ship which is located at the position corresponding to the front end LF of the risk range L may be the front end of the ship area S of the ship, the reference position, the rear end of the ship area S of the ship, or the rear end of the watch area P of the ship.

Figure 14:
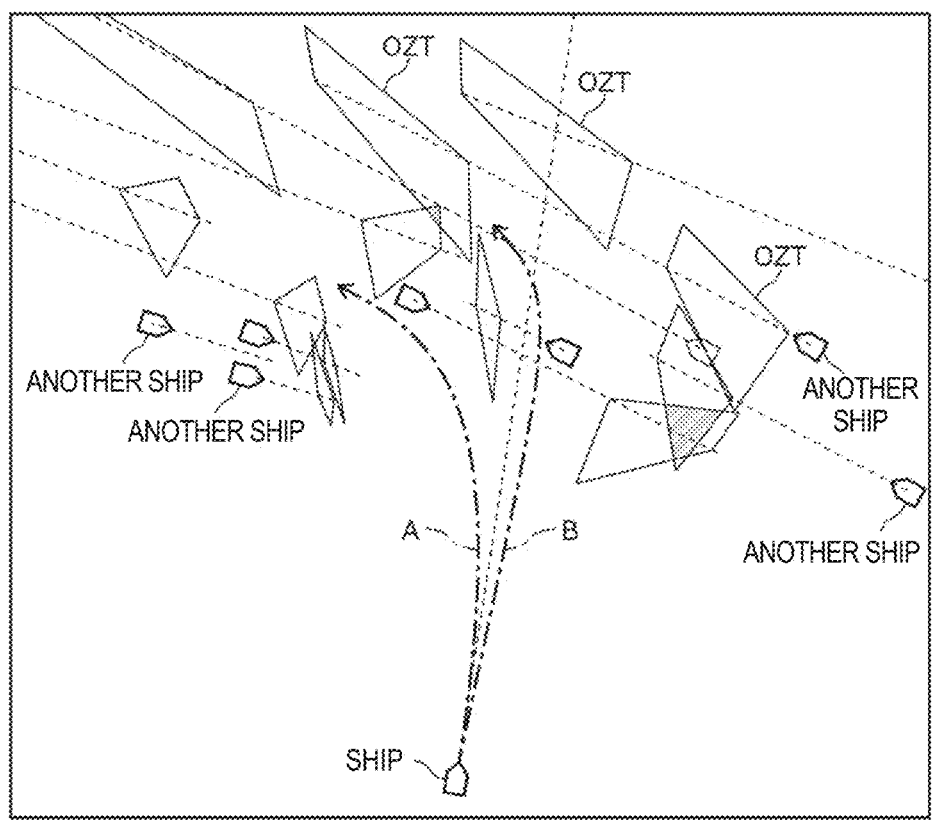
FIG. 14 is a view illustrating one example of indication of an OZT.

FIG. 14 illustrates one example of indication, when displaying the quadrangular OZTs according to this embodiment, in the same situation as the conventional example of FIG. 3.

According to this example, as a result of visualizing the risk of a collision or an approach in the width direction perpendicular to the heading of another ship by the quadrangular OZTs according to this embodiment, when the ship takes the route B, since the OZTs exist near the route A, one can grasp that other ships approach from both left and right sides. On the other hand, when the ship takes the route B, since no OZT exists near the route B, one can grasp that other ships do not approach and relaxed cruising is possible.

Thus, by displaying the quadrangular OZT in consideration of the spatial relationship between the ship and another ship upon an approach, the risk of a collision or an approach is visualized not only in the heading of another ship but also in the width direction perpendicular thereto, and therefore, it becomes possible to express the actual risk more exactly by the OZT.

First Modification

Figure 15A:
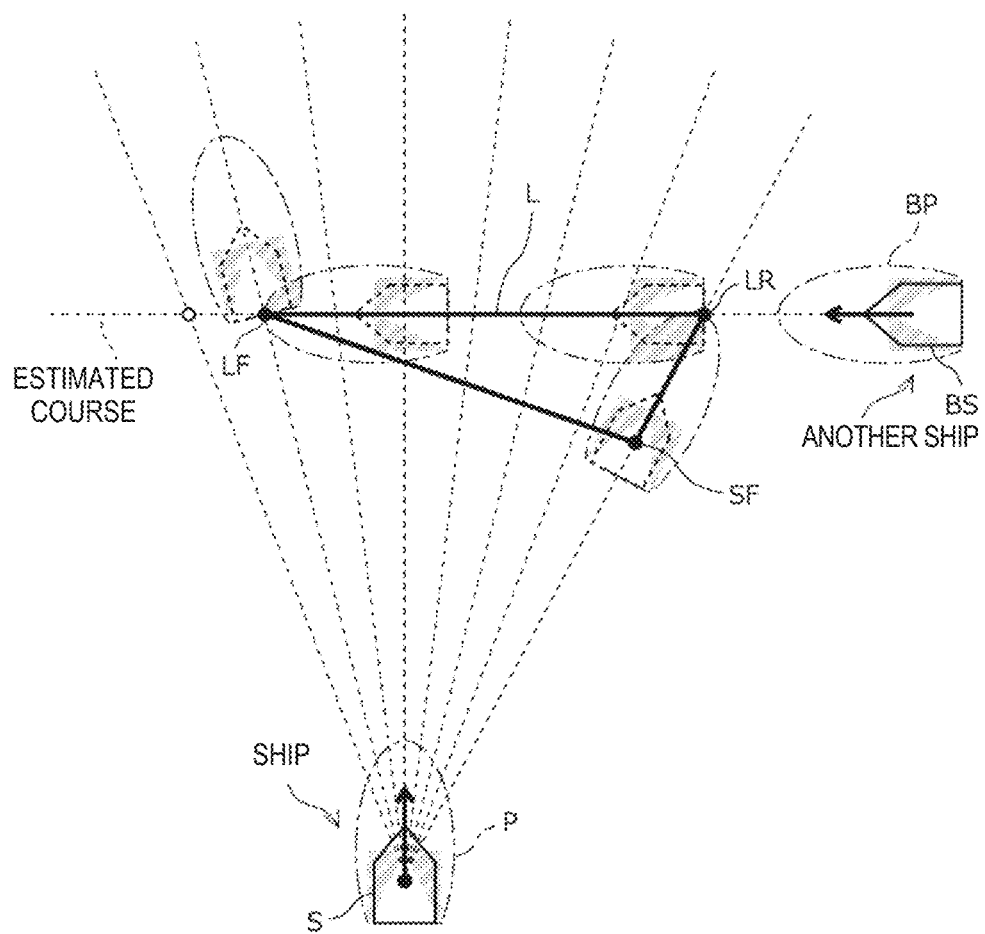
FIG. 15A is a view illustrating one example of a calculation of an OZT.
Figure 15B:
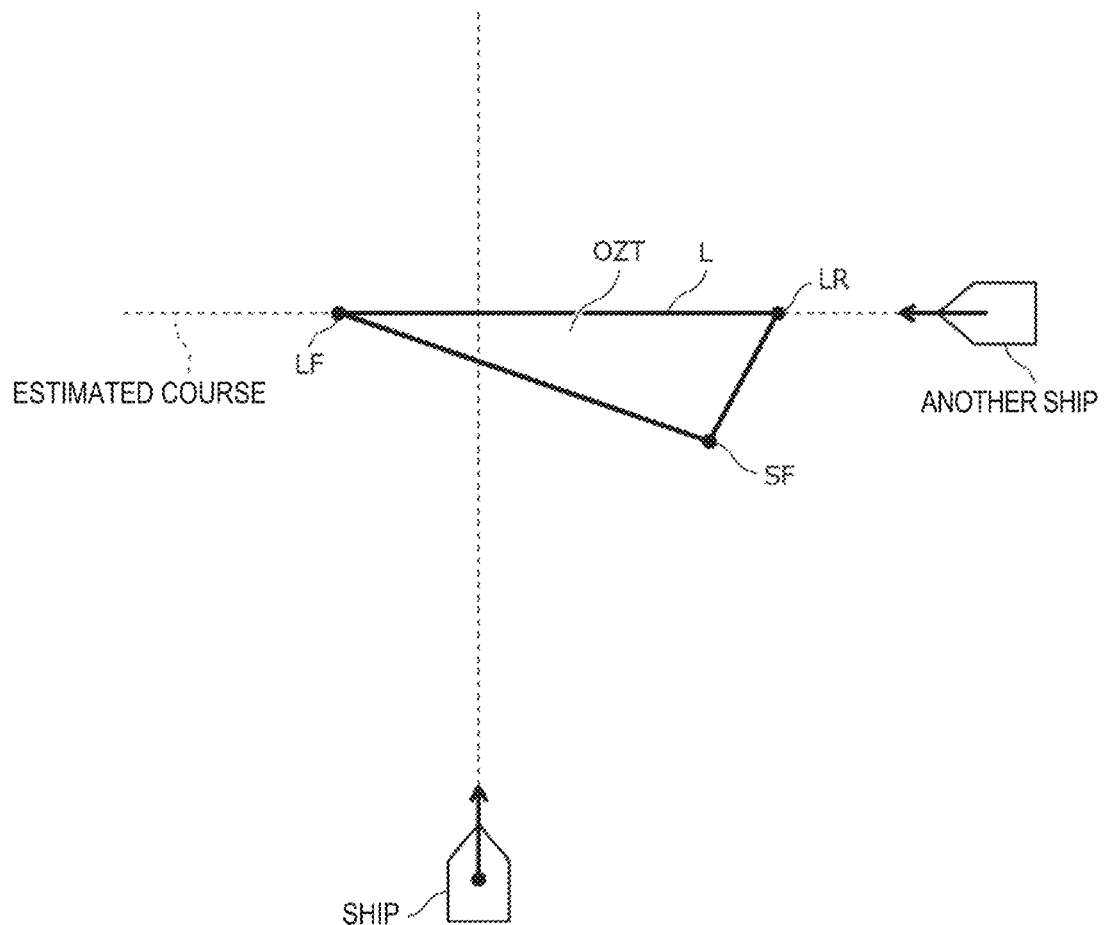
FIG. 15B is a view illustrating one example of indication of an OZT.

Below, a first modification is described. For the configuration which is the same as the above embodiment, detailed description may be omitted by assigning the same reference character. FIGS. 15A and 15B are views illustrating one example of a calculation and indication of the OZTs according to the first modification.

As illustrated in FIG. 15A, when the risk range specifier 11 specifies the risk range L, it may output to the display controller 12 the rear end LR and the front end LF of the risk range L, and the representative point SF of the ship which is located at the position corresponding to the rear end LR, as the positions of the vertexes of the OZT.

As illustrated in FIG. 15B, the display controller 12 may display on the screen of the display unit 2 a triangular OZT having vertexes comprised of the rear end LR and the front end LF of the risk range L specified by the risk range specifier 11, and the representative point SF of the ship which is located at the position corresponding to the rear end LR. Note that the corners of the OZT may be rounded.

That is, in this modification, the representative point SR of the ship which is located at the position corresponding to the front end LF of the risk range L (see FIGS. 8A and 8B) may not be included in the vertexes of the OZT.

In the illustrated example, the rear end LR of the risk range L may become the position at which the front end of the watch area P of the ship contacts the rear end of the ship area BS of another ship. The front end LF of the risk range L may become the position at which the rear end of the ship area S of the ship contacts the front end of the watch area BP of another ship. In this drawing, one example in which the watch area P is not set behind the ship or another ship is illustrated. Without being limited to this configuration, the positions of the rear end LR and the front end LF of the risk range L may be determined in various ways as described above.

Further, the representative point SF of the ship which is located at the position corresponding to the rear end LR of the risk range L may be the reference position RP (see FIG. 5) of the ship. Without being limited to this configuration, the representative point SF of the ship may be the front end or the rear end of the ship area S of the ship.

As illustrated in FIG. 15A, since the front end LF of the risk range L is the position at which the rear end of the ship area S of the ship contacts the front end of the watch area BP of another ship, the meeting relationship in the front of the risk range L may become such that the ship crosses forward of another ship. On the other hand, since the rear end LR of the risk range L is the position at which the front end of the watch area P of the ship contacts the rear end of the ship area BS of another ship, the meeting relationship in the rear of the risk range L may become such that the ship crosses rearward of another ship.

As illustrated in FIG. 15B, the OZT may become in such a shape that its width becomes narrower gradually as it goes toward the front end LF of the risk range L, and it may become sharp toward the front of the risk range L (i.e., a shape indicating the front of the risk range L). Therefore, when the user sees the OZT, he/she can grasp not only the risk of a collision but also the meeting relationship between the ship and another ship in front of and behind the OZT.

In detail, when the ship moves to the sharpened side of the OZT (i.e., forward of the OZT), one can grasp that the ship becomes in the meeting relationship in which the ship crosses the front of another ship. On the other hand, when the ship moves to the side of the OZT which is not sharpened, in other words, the side where the OZT has a side extending toward the ship (i.e., rearward of the OZT), one can grasp that the ship becomes in the meeting relationship in which the ship crosses the rear of another ship.

Figure 15C:
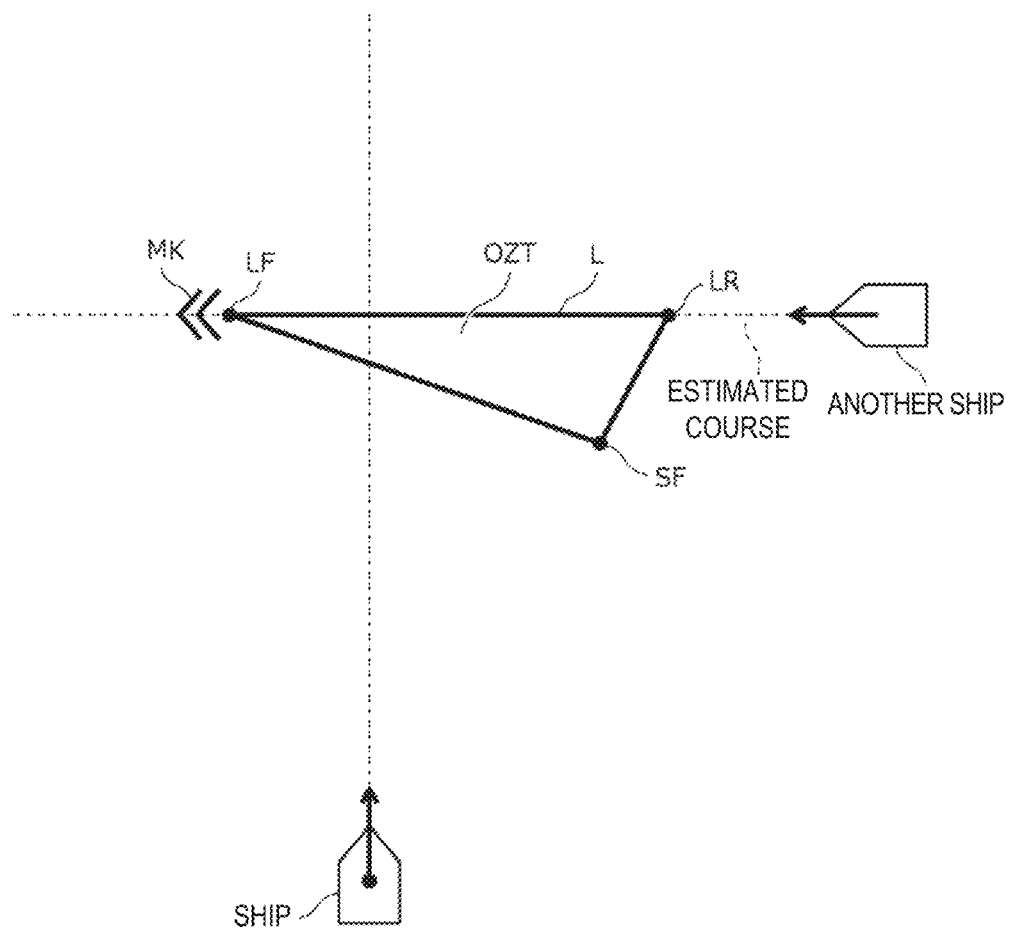
FIG. 15C is a view illustrating one example of indication of an OZT.

As illustrated in FIG. 15C, the display controller 12 may display an index MK which is associated with the front end LF of the risk range L. The index MK may have a shape indicating forward of the risk range L. In detail, the index MK is formed, for example, in a chevron shape, which indicates a direction by the orientation of the crest. Without being limited to this configuration, the index MK may have an arrow shape or a boomerang shape, for example.

Further, the index MK may be associated with the front end LF of the risk range L by being displayed near the front end LF of the risk range L. In detail, the index MK may be disposed in front of the OZT on the estimated course of another ship to indicate the heading. Without being limited to this configuration, the index MK may be coupled to the front end LF of the risk range L, or may be connected via a leading line.

By displaying such an index MK, it becomes easier for the user to grasp the moving direction of another ship. Further, by displaying the index MK, it becomes easier for the user to grasp that the ship becomes in the meeting relationship in which it crosses the front of another ship, when the ship moves forward of the OZT.

Figure 16A:
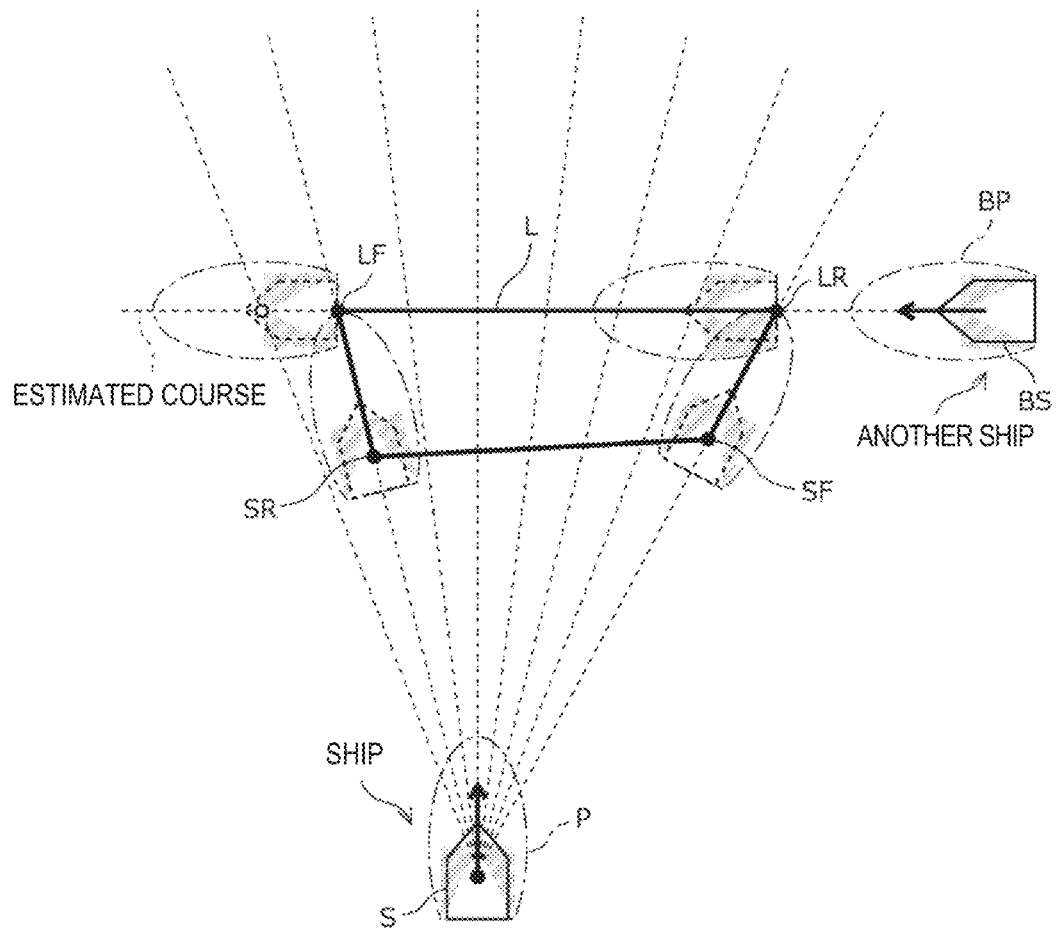
FIG. 16A is a view illustrating one example of a calculation of an OZT.
Figure 16B:
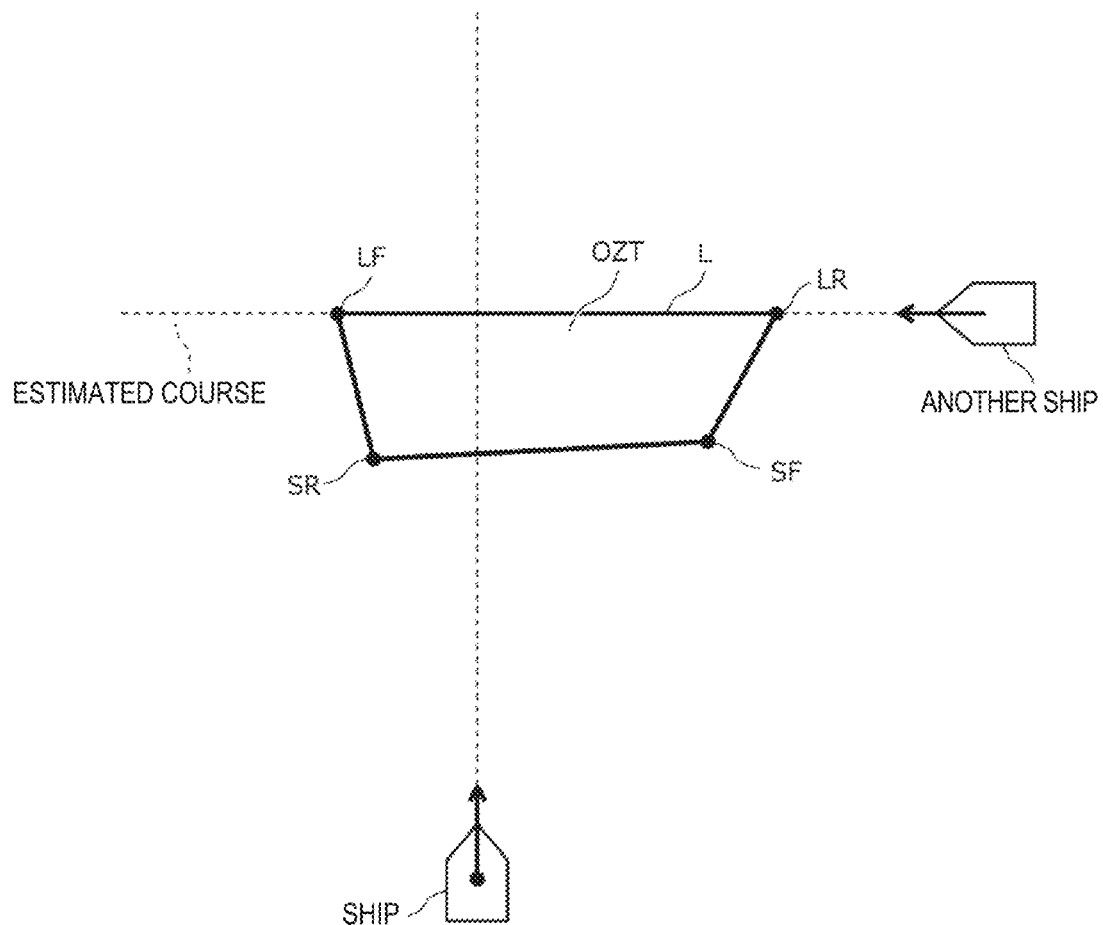
FIG. 16B is a view illustrating one example of indication of an OZT.

FIGS. 16A and 16B are views illustrating another example of a calculation and indication of an OZT. As illustrated in FIG. 16A, when the ship speed of another ship is high, the front end of the watch area P of the ship may contact the rear end of the ship area BS of another ship, both at the front end LF and the rear end LR of the risk range L.

In this case, the risk range specifier 11 may output to the display controller 12 the rear end LR and the front end LF of the risk range L, the representative point SF of the ship which is located at the position corresponding to the rear end LR, and the representative point SR of the ship which is located at the position corresponding to the front end LF, as the positions of the vertexes of the OZT.

As illustrated in FIG. 16B, the display controller 12 may display on the screen of the display unit 2 the quadrangular OZT having vertexes comprised of the rear end LR and the front end LF of the risk range L, the representative point SF of the ship which is located at the position corresponding to the rear end LR, and the representative point SR of the ship which is located at the position corresponding to the front end LF.

Thus, by displaying such a quadrangular OZT, the user can grasp that the ship becomes in the meeting relationship in which it crosses the rear of another ship, whether it moves forward or rearward of the OZT.

Figure 16C:
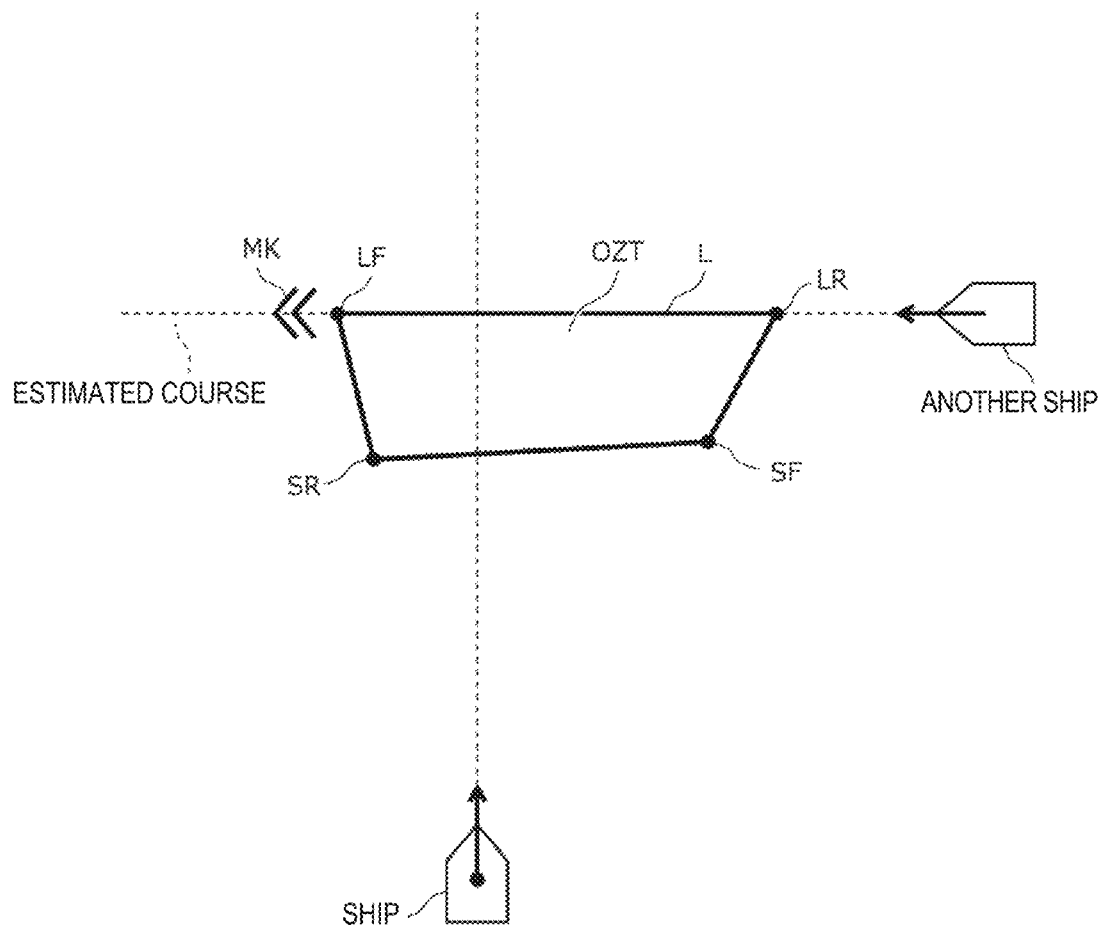
FIG. 16C is a view illustrating one example of indication of an OZT.

Further, as illustrated in FIG. 16C, the display controller 12 may display the index MK which is associated with the front end LF of the risk range L. By displaying such an index MK, it becomes easier for the user to grasp the moving direction of another ship.

Second Modification

Below, the second modification is described. For the configuration which is the same as the above embodiment, detailed description may be omitted by assigning the same reference character.

Figure 17:
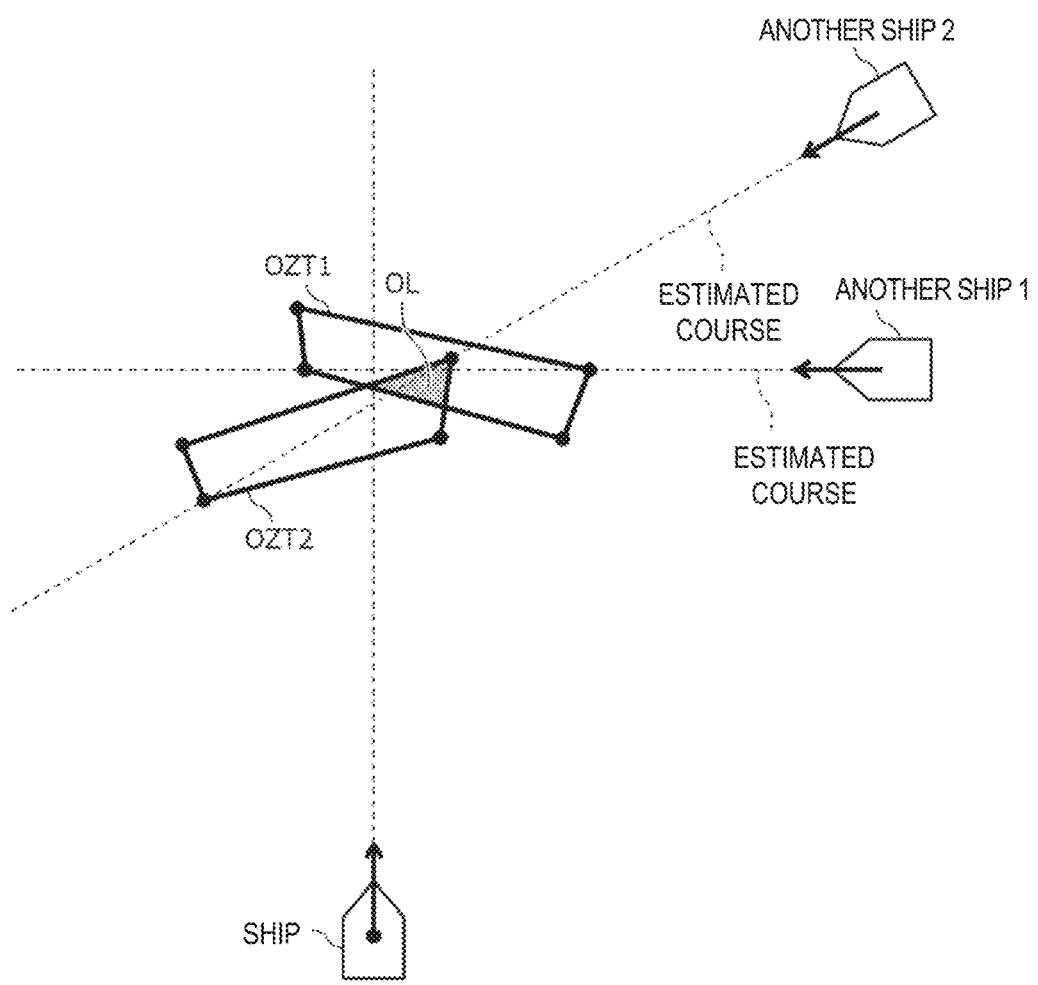
FIG. 17 is a view illustrating one example of indication of an OZT.

FIG. 17 is a view illustrating one example of indication of an OZT according to the second modification. This drawing illustrates one example in which an OZT1 indicative of the risk of a collision between the ship and another ship 1 partially overlaps with an OZT2 indicative of the risk of a collision between the ship and another ship 2.

The display controller 12 may differentiate a display mode of an overlapping part OL and a non-overlapping part in the OZT 1 and the OZT2, by shade, color, or texture. For example, the display controller 12 displays the overlapping part OL deeper than other parts. The OZT1 and OZT2 may be created translucently and they may be displayed to be overlapped so that the overlapping part OL is displayed deeper than other parts.

Accordingly, since the overlapping part OL among the plurality of OZT 1 and OZT2 where the ship may collide with the plurality of other ships 1 and 2 is displayed discriminatingly from other parts, it becomes easier for the user to grasp the zone where the risk of a collision is higher.

Figure 18A:
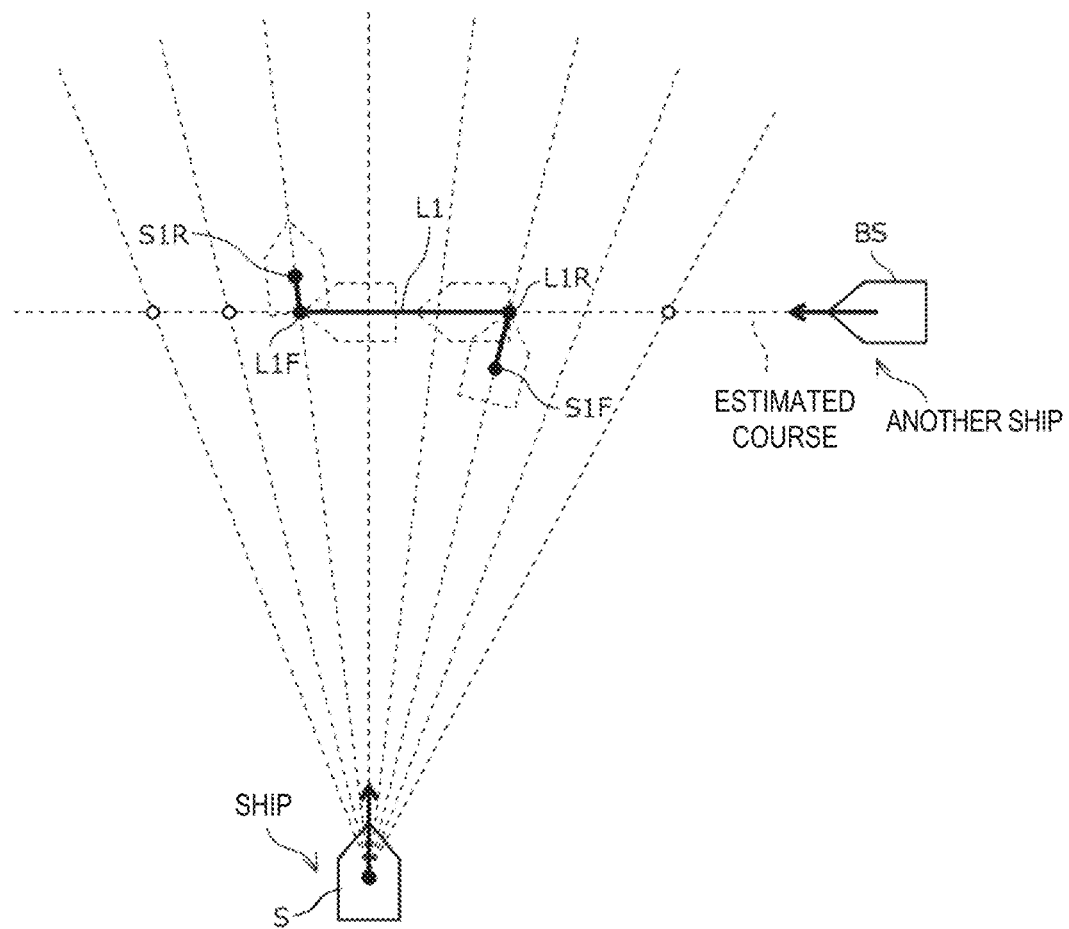
FIG. 18A is a view illustrating one example of a calculation of an OZT.
Figure 18B:
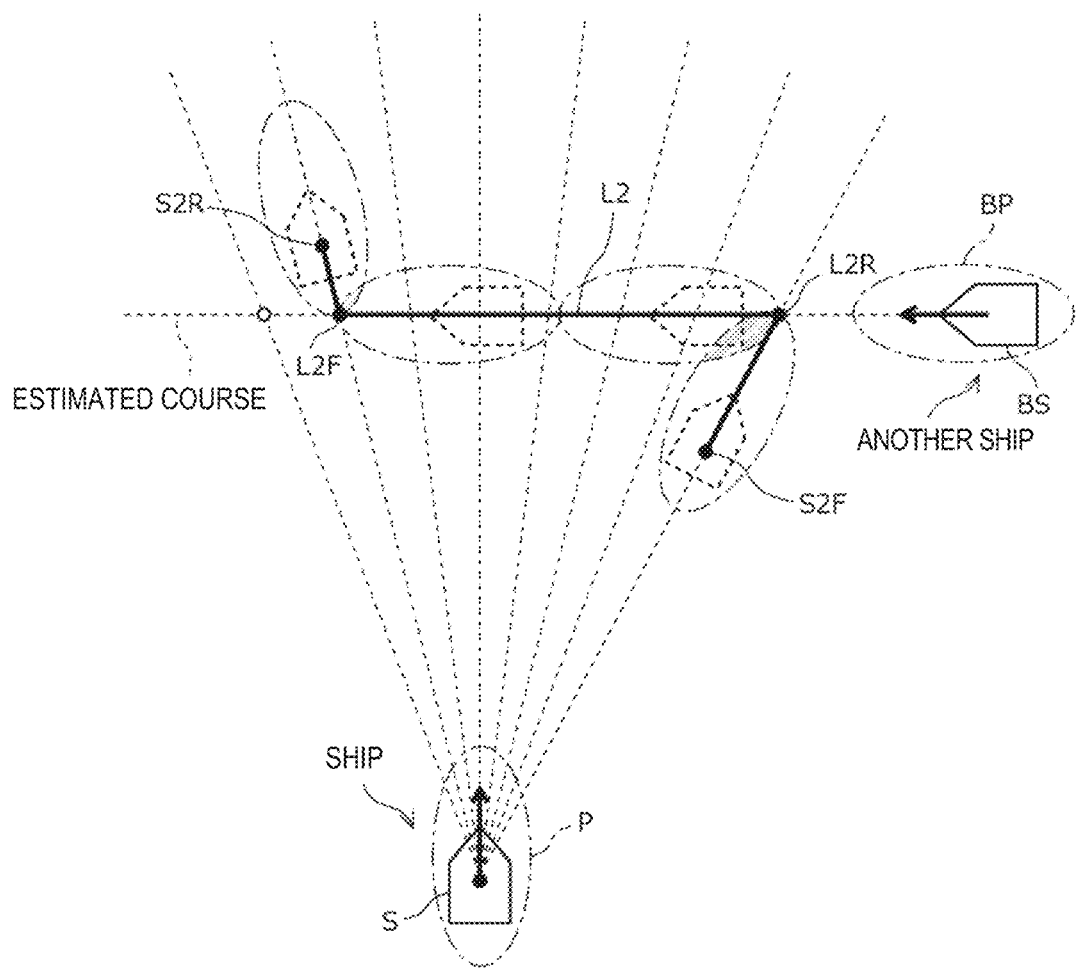
FIG. 18B is a view illustrating one example of a calculation of an OZT.
Figure 18C:
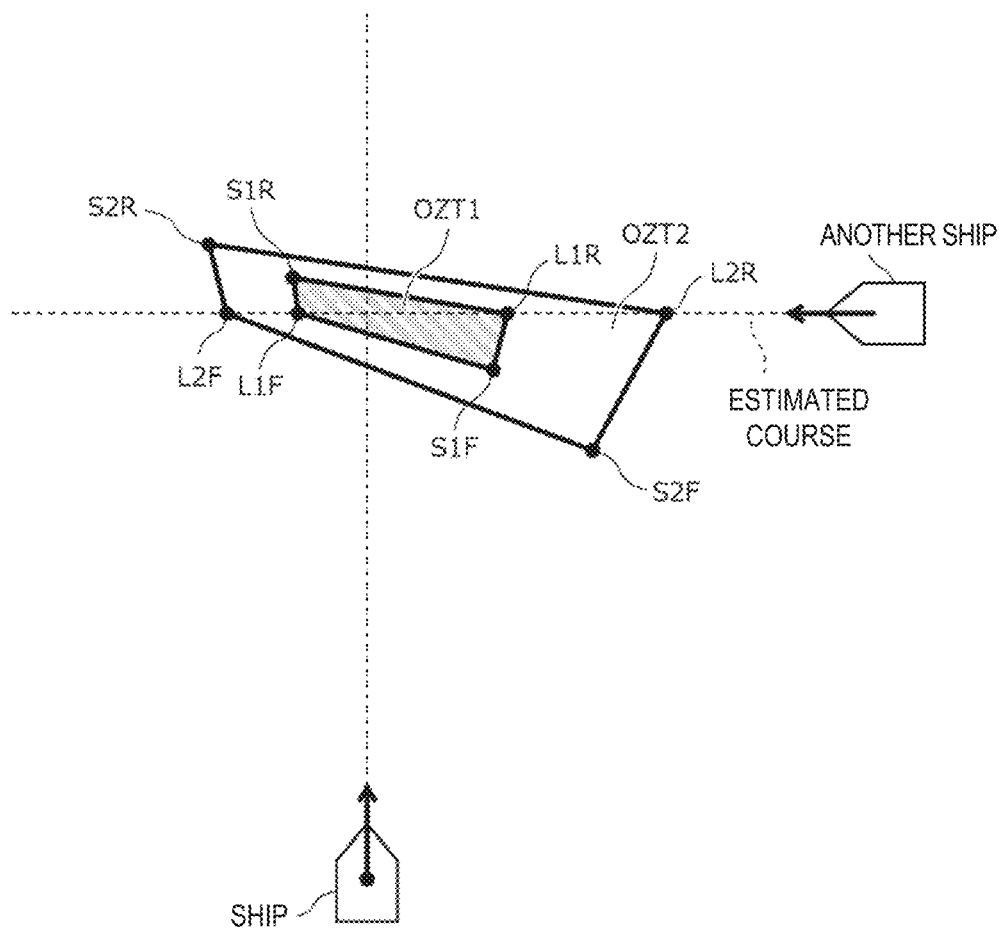
FIG. 18C is a view illustrating one example of indication of an OZT.

FIGS. 18A to 18C are views illustrating another example of a calculation and indication of an OZT. The risk range specifier 11 may specify a collision range L1 (see FIG. 18A) where the ship area S of the ship overlaps with the ship area BS of another ship, and an approach range L2 (see FIG. 18B) where the watch area P of the ship overlaps with the watch area BP of another ship, as the risk ranges.

As illustrated in FIG. 18A, a rear end L1R of the collision range L1 may become a position at which the front end of the ship area S of the ship contacts the rear end of the ship area BS of another ship. A front end L1F of the collision range L1 may become a position at which the rear end of the ship area S of the ship contacts the front end of the ship area BS of another ship.

Further, a representative point S1F of the ship which is located at a position corresponding to the rear end L1R of the collision range L1, and a representative point S1R of the ship which is located at a position corresponding to the front end L1F of the collision range L1 may be the reference positions RP (see FIG. 5) of the ship.

As illustrated in FIG. 18B, a rear end L2R of the approach range L2 may become a position at which the front end of the watch area P of the ship contacts the rear end of the watch area BP of another ship. A front end L2F of the approach range L2 may become a position at which the rear end of the watch area P of the ship contacts the front end of the watch area BP of another ship.

Further, a representative point S2F of the ship which is located at a position corresponding to the rear end L2R of the approach range L2, and the representative point S2R of the ship which is located at the position corresponding to the front end L2F of the collision range L2 may be the reference positions RP (see FIG. 5) of the ship.

The display controller 12 may display on the screen of the display unit the quadrangular OZT1 having vertexes comprised of the points L1R, L1F, S1F, and S1R according to the collision range L1, and the quadrangular OZT2 having vertexes comprised of the points L2R, L2F, S2F, and S2R according to the approach range L2.

The OZT1 according to the collision range L1 may be a zone where the possibility of a future collision between the ship and another ship is high. The OZT2 according to the approach range L2 may be a zone where the possibility of a future approach between the ship and another ship is high, though the possibility of the collision is not as high as in the OZT1. The OZT1 may be included in the OZT2.

The display controller 12 may differentiate the display mode, such as shade, color, or texture, mutually between the OZT1 according to the collision range L1 and the OZT2 according to the approach range L2. For example, the display controller 12 displays the OZT1 deeper than the OZT2. The OZT1 and the OZT2 may be created translucently, and may be displayed to be overlapped so that the OZT1 is displayed deeper than the OZT2.

Thus, since the OZT1 according to the collision range L1 and the OZT2 according to the approach range L2 are displayed discriminatingly, it becomes easier for the user to grasp a degree of the risk of a collision or an approach.

Although the embodiments of the present disclosure are described above, the present disclosure is not limited to the above embodiments, and it is needless to say that various changes are possible for a person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Information Processing Device, 2 Display Unit, 3 Radar, 4 AIS, 5 GNSS Receiver, 6 Gyrocompass, 7 ECDIS, 8 Alarm Part, 11 Risk Range Specifier, 12 Display Controller, 13 Size Data Holder, 100 Ship Monitoring System

The invention claimed is:

1. A ship monitoring system, comprising:
a first data generator configured to generate first ship data indicative of a position and a velocity of a first ship;
a second data generator configured to generate second ship data indicative of a position and a velocity of a second ship; and
processing circuitry configured to:
specify a risk range where a risk value indicative of a risk of a collision between the first ship and the second ship is above a threshold among an estimated course of the second ship, based on a position of the first ship and a position of the second ship at each timing, that are estimated from the first ship data and the second ship data, when assuming that the first ship changes a course to an arbitrary direction and crosses the estimated course of the second ship, and
display a polygonal OZT (Obstacle Zone by Target) having vertexes at least comprised of a rear end and a front end of the risk range, and a representative point of the first ship located at a position corresponding to the rear end of the risk range.

2. The ship monitoring system of claim 1, wherein the OZT is a quadrangle having vertexes comprised of the rear end and the front end of the risk range, the representative point of the first ship located at the position corresponding to the rear end of the risk range, and a representative point of the first ship located at a position corresponding to the front end of the risk range.

3. The ship monitoring system of claim 1, wherein the rear end of the risk range is a position at which a front end of a watch area set around the first ship contacts a point indicating the position of the second ship, a rear end of a ship area occupied by the second ship, or a rear end of the watch area set around the second ship.

4. The ship monitoring system of claim 1, wherein the front end of the risk range is a position at which a rear end of a watch area set around the first ship contacts a point indicating the position of the second ship, a front end of a ship area occupied by the second ship, or a front end of the watch area set around the second ship.

5. The ship monitoring system of claim 1, wherein the rear end of the risk range is a position at which a rear end of a watch area set around the first ship contacts a point indicating the position of the second ship, a front end of a ship area occupied by the second ship, or a front end of the watch area set around the second ship.

6. The ship monitoring system of claim 1, wherein the front end of the risk range is a position at which a front end of a watch area set around the first ship contacts a point indicating the position of the second ship, a rear end of a ship area occupied by the second ship, or a rear end of the watch area set around the second ship.

7. The ship monitoring system of claim 1, wherein the representative point of the first ship located at the position corresponding to the rear end of the risk range is a front end of a ship area occupied by the first ship, a point indicating the position of the first ship, a rear end of the ship area occupied by the first ship, or a rear end of a watch area set around the first ship.

8. The ship monitoring system of any one of claim 1, wherein a representative point of the first ship located at the position corresponding to the front end of the risk range is a rear end of a ship area occupied by the first ship, a point indicating the position of the first ship, a front end of the ship area occupied by the first ship, or a front end of a watch area set around the first ship.

9. The ship monitoring system of claim 1, wherein the OZT has a triangular shape having vertexes comprised of the rear end and the front end of the risk range, and the representative point of the first ship located at the position corresponding to the rear end of the risk range.

10. The ship monitoring system of claim 9, wherein, when the first ship becomes in a meeting relationship in which the first ship crosses the front of the second ship in a front of the risk range, the display unit displays the OZT as a triangle having vertexes comprised of the rear end and the front end of the risk range, and the representative point of the first ship located at the position corresponding to the rear end of the risk range.

11. The ship monitoring system of claim 10, wherein, when the second ship becomes in a meeting relationship in which the second ship crosses the front of the first ship in the front of the front end of the risk range, the display unit displays the OZT as a quadrangle having vertexes comprised of the rear end and the front end of the risk range, the representative point of the first ship located at the position corresponding to the rear end of the risk range, and a representative point of the first ship located at a position corresponding to the front end of the risk range.

12. The ship monitoring system of claim 1, wherein the processing circuitry displays an index associated with the front end of the risk range of the OZT.

13. The ship monitoring system of claim 1, wherein, among a plurality of OZTs displayed for a plurality of second ships, the processing circuitry mutually differentiates a display mode of a part where the plurality of OZTs overlap, and a display mode of a part where the plurality of OZTs do not overlap.

14. The ship monitoring system of claim 1, wherein the processing circuitry specifies, as the risk ranges, a collision range where a ship area occupied by the first ship overlaps with a ship area occupied by the second ship, and an approach range where a watch area set around the first ship overlaps with the ship area occupied by the second ship or a watch area set around the second ship, and
wherein the processing circuitry mutually differentiates a display mode of the collision range and a display mode of the approach range.

15. The ship monitoring system of claim 1, wherein the first data generator includes a GNSS receiver mounted on the first ship and configured to detect the position of the first ship based on a radio wave received from a GNSS (Global Navigation Satellite System).

16. The ship monitoring system of claim 1, wherein the second data generator includes a radar mounted on the first ship and configured to detect the position and the velocity of the second ship based on echo data generated by receiving a reflection wave of a radio wave transmitted around the first ship.

17. A ship monitoring method, comprising the steps of:
generating, by a first data generator, first ship data indicative of a position and a velocity of a first ship;
generating, by a second data generator, second ship data indicative of a position and a velocity of a second ship;
specifying a risk range where a risk value indicative of a risk of a collision between the first ship and the second ship is above a threshold among an estimated course of the second ship, based on a position of the first ship and a position of the second ship at each timing, that are estimated from the first ship data and the second ship data, when assuming that the first ship changes a course to an arbitrary direction and crosses the estimated course of the second ship; and
displaying, by a display unit, a polygonal OZT (Obstacle Zone by Target) having vertexes at least comprised of a rear end and a front end of the risk range, and a representative point of the first ship located at a position corresponding to the rear end of the risk range.

18. An information processing device, comprising:
processing circuitry configured to:
specify a risk range where a risk value indicative of a risk of a collision between a first ship and a second ship is above a threshold among an estimated course of the second ship, based on a position of the first ship and a position of the second ship at each timing, that are estimated from first ship data indicative of a position and a velocity of the first ship and second ship data indicative of a position and a velocity of the second ship, when assuming that the first ship changes a course to an arbitrary direction and crosses the estimated course of the second ship, and
display, on a display unit, a polygonal OZT (Obstacle Zone by Target) having vertexes at least comprised of a rear end and a front end of the risk range, and a representative point of the first ship located at a position corresponding to the rear end of the risk range.

* * * * *